(12) United States Patent

Yasukawa et al.

(10) Patent No.: US 7,652,998 B2
(45) Date of Patent: Jan. 26, 2010

(54) MULTICAST COMMUNICATION PATH CALCULATION METHOD AND MULTICAST COMMUNICATION PATH CALCULATION APPARATUS

(75) Inventors: Seisho Yasukawa, Tokyo (JP); Koji Sugisono, Tokyo (JP); Masanori Uga, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 839 days.

(21) Appl. No.: 10/731,156

(22) Filed: Dec. 10, 2003

(65) Prior Publication Data

US 2004/0218536 A1 Nov. 4, 2004

(30) Foreign Application Priority Data

Dec. 11, 2002 (JP) ............................. 2002-359667
Dec. 11, 2002 (JP) ............................. 2002-359710

(51) Int. Cl.
H04L 1/00 (2006.01)

(52) U.S. Cl. ................... 370/238; 370/238.1; 370/255; 370/256; 709/240

(58) Field of Classification Search ................ 370/238, 370/238.1, 255, 256; 709/240
See application file for complete search history.

(56) References Cited

U.S. PATENT DOCUMENTS

| 6,088,333 | A * | 7/2000 | Yang et al. | 370/238 |
| 6,697,335 | B1 * | 2/2004 | Ergun et al. | 370/238 |
| 6,717,921 | B1 * | 4/2004 | Aggarwal et al. | 370/256 |
| 6,762,997 | B1 * | 7/2004 | Liu et al. | 370/238 |
| 6,778,531 | B1 * | 8/2004 | Kodialam et al. | 370/390 |
| 7,020,086 | B2 * | 3/2006 | Juttner et al. | 370/238 |
| 7,047,316 | B2 * | 5/2006 | Iwata et al. | 709/240 |
| 2003/0005149 | A1 * | 1/2003 | Haas et al. | 709/238 |

OTHER PUBLICATIONS

G. N. Rouskas, et al., IEEE Journal on Selected Areas in Communications, vol. 15, No. 3, pp. 346-356, "Multicast Routing With End-to-End Delay and Delay Variation Constraints", Apr. 1997.

P.-R. Sheu, et al., IEEEICC, pp. 611-618, "A Fast and Efficient Heuristic Algorithm for the Delay-and Delay Variation Bound Multicast Tree Problem", 2001.

(Continued)

*Primary Examiner*—William Trost, IV
*Assistant Examiner*—Toan D Nguyen
(74) *Attorney, Agent, or Firm*—Oblon, Spivak, McClelland, Maier & Neustadt, L.L.P.

(57) ABSTRACT

A multicast communication path calculation method is disclosed which includes the steps of: obtaining minimum delay paths from a source node to each destination node; selecting, as candidate nodes of a rendezvous point node, nodes on one of the obtained minimum delay paths; for each candidate node, calculating minimum delay paths from the candidate node to each destination node, and obtaining a difference between the maximum value and the minimum value among delays of the calculated minimum delay paths; selecting, as the rendezvous point node, a candidate node by which the difference is smallest; and outputting a minimum delay path from the source node to the rendezvous point node and minimum delay paths from the rendezvous point node to each destination node.

11 Claims, 20 Drawing Sheets

OTHER PUBLICATIONS

L. Kou, et al., Acta Informatica, vol. 15, pp. 141-145, "A Fast Algorithm for Steiner Trees", 1981.

Sun Wensheng, et al., "Routing Multipoint Connections in Computer Networks", IEEE, ISCAS '98, XP-010289723, May 31, 1998, pp. VI-494-VI-497.

L. Berman, et al., IBM Technical Disclosure Bulletin, vol. 24, No. 5, XP-002275033, pp. 2511-2512, "Fast Algorithm for Steiner Trees", Oct. 1981.

* cited by examiner

TOTAL COST

MULTICAST COMMUNICATION PATH CALCULATION METHOD AND MULTICAST COMMUNICATION PATH CALCULATION APPARATUS

BACKGROUND OF THE INVENTION

1. Field of the Invention

The present invention relates to a technology for calculating multicast paths in a multicast communication network. More particularly, the present invention relates to a technology for calculating efficient multicast paths from a source node to each destination node for transmitting multicast traffic.

2. Description of the Related Art

Attention is being given to multicast communication for delivering moving images and voices to a plurality of specific users on a computer network. In the multicast communication network, a source node is connected to destination nodes via a rendezvous point node at which a path is divided into a plurality of paths to the destination nodes. At the rendezvous point node, multicasted data are copied and transferred over the plurality of paths to the destination nodes.

As for unicast communication in which a source node is connected to each destination node in a one-to-one relationship, the source node needs to prepare copies of information the number of which is the same as that of the destination nodes. Thus, by using multicast communication, the amount of information transmitted over the network can be decreased.

In multicast communication, a set of destination nodes is called a multicast group, and a set of multicast paths are established from the source node to each node of the multicast group. The multicast paths are established such that the source node is connected to all of the destination nodes that belong to the multicast group. A user who wants to obtain information that is transferred to a multicast group joins the multicast group. Thus, the multicast paths change according to the joining state of users.

There are a plurality of applications that utilize multicast communication, such as videoconferences, on-line games, and applications for delivering moving images such as movies and television programs. As to the videoconferences and the on-line games, destination nodes correspond to a plurality of users, in addition, each of the plurality of users may become a source node when responding to received data. As for such applications, attention is being given to a technology for equalizing times at which each user responds to data transmitted via the multicast network so that occasion of response is equalized for each user. For equalizing the response times, there is a technology in which multicast paths from the source node to each destination node are designed such that similar delay arises in each multicast path.

Differences among delays along the paths between the source node and each destination node are called delay variation among users. However, currently, algorithms for calculating minimum delay paths are mainly used, and there is no communication method adopting an algorithm for calculating paths in consideration of the delay variation among users. There are following conventional examples of algorithms for decreasing delay variation among users:

Document 1: G, Rouskas, et. al., "Multicast Routing With End-to-End Delay and Delay Variation Constraints", IEEE Journal on Selected Areas in Communication, Vol 15, NO. 3, April 1997.

Document 2: Pi-Rong Sheu, et. al., "A Fast and Efficient Heuristic Algorithm for the Delay and Delay Variation Bound Multicast Tree Problem", IEEEICC, 2001.

The document 1 is the first document that try to solve the above-mentioned problem. Following is the method for calculating paths according to the document 1.

First, each minimum delay path between a source node and each destination node is calculated, and a delay w of a path that has maximum delay among the minimum delay paths is checked. Assuming that $\Delta$ is delay variation acceptable by an application (this parameter means that the difference of the maximum end-to-end delay and the minimum end-to-end delay among the paths from the source node to all the destination nodes has to be kept within $\Delta$), paths which satisfy $d_i \leq w - \Delta$ are adopted in which $d_i$ indicates a delay between the source node and the destination node i. As for a path that is not adopted, a path that satisfies the condition is searched for by using an algorithm for searching for a k-th shortest path. Then, the searched path is adopted. Assuming that the number of the destination nodes is m and the number of nodes in the network is n, then the computation time complexity of this method is $O(kmn^3)$.

In the document 2, a method is proposed in which the time complexity is smaller than that of the document 1, so that calculation time for obtaining paths is shortened. The method of calculation is as follows.

The multicast paths include an one-to-one unicast path between the source node and a rendezvous point node (that can be also called as a central node) and one-to-many paths between the rendezvous point node and each destination node. In the method of document 2, the minimum delay between each destination node and each other node in the network is calculated first. Next, for each node in the network, associated multicast delay variation between the node and each destination node is calculated. Then, a node with the minimum multicast delay variation is selected as the rendezvous point node. Finally, each destination node is connected to this rendezvous point node through the minimum delay path, the source node is also connected to the rendezvous point node through the minimum delay path. The time complexity of this method is $O(n^3)$, and calculation faster than document 1 can be realized.

There are following problems in the above-mentioned conventional technologies.

According to the above-mentioned two calculation methods, the time complexity becomes large. Since applications that require decrease of the delay variation generally need real-time processing, it is desirable to decrease time complexity. In addition, it is requested to decrease transmission delay for the real-time applications. As for the method of the document 2 in which rendezvous point is provided, it is pointed out that realizing minimum delay path is generally difficult. Therefore, there is a problem in that the transmission delay to each destination node becomes generally large according to the method of the document 2.

When establishing the multicast communication network, from the viewpoint of establishing multicast paths efficiently between a source node and each destination node, a minimal tree problem is known in which total cost of the multicast paths is minimized. This problem is called a Steiner tree problem. The Steiner tree problem is known as NP problem in which it is impossible to calculate paths that form an optimal minimal tree from the source node to each destination node in a finite calculation time if the size of the network is large.

Although to obtain the ideal solution of the Steiner problem is NP hard, a calculation method for heuristically deriving an approximated solution is proposed as KMB communication method (refer to document 3: L. Kou, G. Markowsky, and L. Berman, "A Fast Algorithm for Steiner Tree," Acta Informatica 15, 1981, pp. 141-145.).

In this method, the source node and the destination node group are extracted, and a graph formed by edges each corresponding to a shortest path between extracted nodes is constructed first. From the constructed graph, a minimal spanning tree is constructed. Then, each edge of the spanning tree is replaced by shortest path of the input graph to construct a subgraph. Then, a minimal spanning tree is found from the subgraph. Finally, multicast paths (Steiner tree) are constructed by deleting unnecessary edges from the spanning tree.

However, according to the multicast path calculation method of the document 3, although the transfer cost of the whole multicast paths can be minimized, the method does not consider the cost (delay) variation from the source node to each destination node. Thus, the cost variation becomes very large. Therefore, when applying this calculation method to the real-time application that does not permit large delay variation, there is a large problem in that large delay variation occurs among multicast receivers.

SUMMARY OF THE INVENTION

An object of the present invention is to improve computation time complexity for calculating multicast paths and to decrease delay variation among users. Another object of the present invention is to decrease delay variation among users while suppressing total cost of multicast paths.

The object can be achieved by a multicast communication path calculation method for obtaining multicast paths from a given source node to a plurality of destination nodes in a network including a plurality of nodes, the method including the steps of:

obtaining minimum delay paths from the source node to each destination node by using topology information and delay information of the network;

selecting, as candidate nodes of a rendezvous point node, nodes on one of the obtained minimum delay paths;

for each candidate node, calculating minimum delay paths from the candidate node to each destination node, and obtaining a difference between the maximum value and the minimum value among delays of the calculated minimum delay paths;

selecting, as the rendezvous point node, a candidate node by which the difference is smallest among differences for each candidate node; and outputting, as the multicast paths, a minimum delay path from the source node to the rendezvous point node and minimum delay paths from the rendezvous point node to each destination node.

According to the present invention, the delay variation among users can be decreased with computation time complexity lower than conventional technology.

In the multicast communication path calculation method, the minimum delay path on which the candidate nodes exist may be one having maximum delay among minimum delay paths from the source node to each destination node.

The object can be also achieved by a multicast communication path calculation method for obtaining multicast paths from a given source node to a plurality of destination nodes in a network including a plurality of nodes, the method including the steps of:

receiving a distance graph including topology and cost of the network;

establishing a first distance subgraph in which the source node is deleted from the received distance graph;

selecting the destination nodes from the first distance subgraph, and obtaining a second distance subgraph in which each edge is a shortest path between two of the destination nodes, and establishing a first minimal spanning tree of the second distance subgraph;

establishing a subgraph of the first minimal spanning tree by including intermediate nodes in each edge of the first minimal spanning tree, and establishing a second minimal spanning tree of the subgraph;

deleting unnecessary edges from the second minimal spanning tree so that a tree including the destination nodes is established;

assuming that nodes that form the tree are candidate nodes of a rendezvous point node, obtaining, for each candidate node, a difference between the maximum distance and the minimum distance among distances between the candidate node and each destination node, and selecting, as the rendezvous point node, a candidate node by which the difference is smallest; and obtaining the multicast paths by connecting the tree and the source node at the rendezvous point node, and outputting the multicast paths.

According to the present invention, the method includes a calculation process for minimizing total tree cost, and a calculation process for shaping the tree such that delay variation from the source node to each destination node is small. Thus, multicast paths can be obtained in which the delay variation can be decreased while total cost of the multicast paths is minimized.

In addition, in the calculated minimal tree, the rendezvous point node for optimizing the delay variation can be dynamically set, which is different from the conventional technology.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention are described.

First Embodiment

First, a multicast communication path establishment method according to the first embodiment is described with reference to figures.

Figure 1:
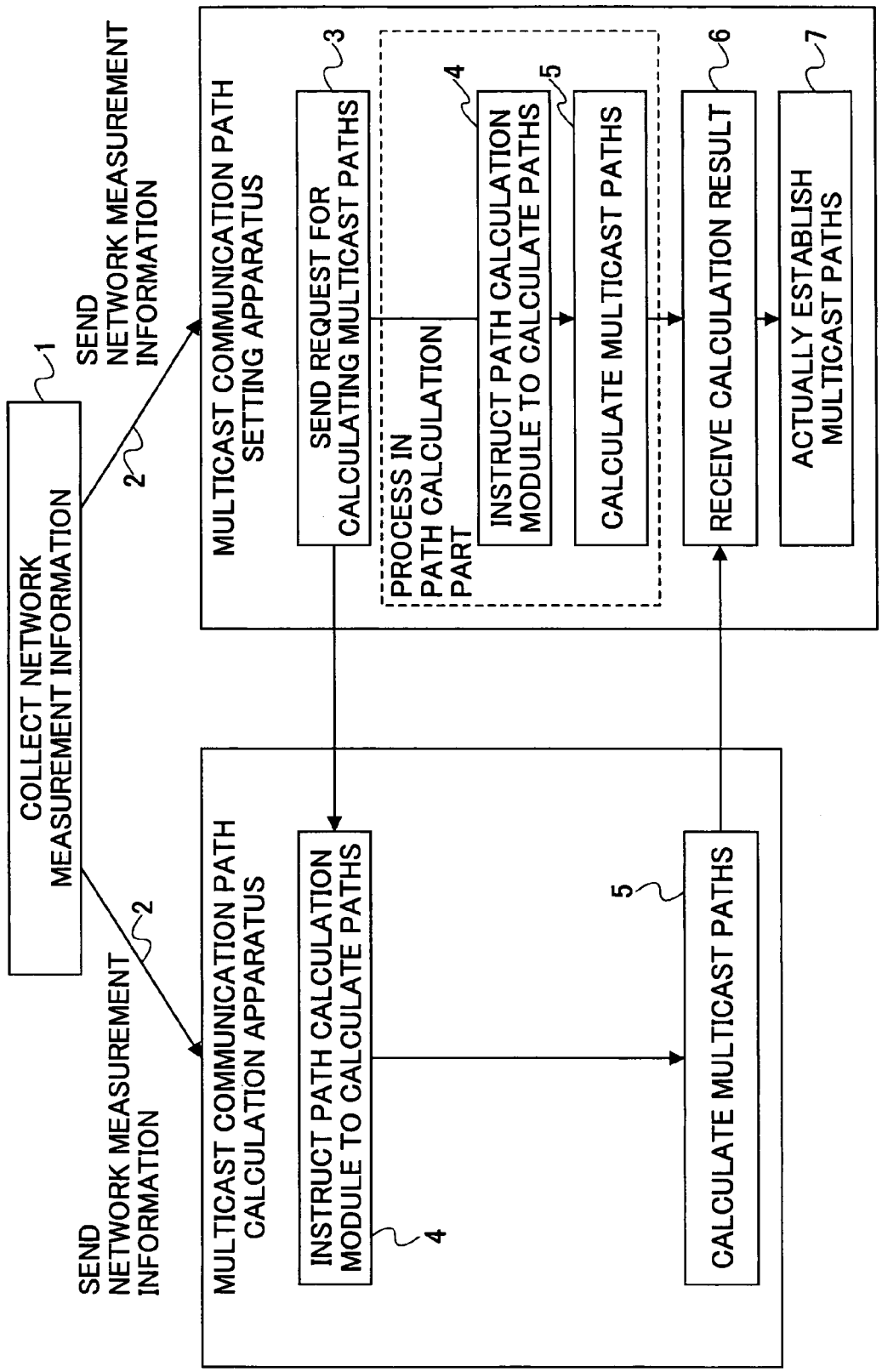
FIG. 1 is a figure for explaining the outline of the first embodiment.

FIG. 1 is a figure for explaining the outline of the first embodiment. A multicast network of the first embodiment includes a plurality of nodes each including a multicast transfer apparatus. A multicast communication path calculation apparatus is provided in a node, and a multicast communication path setting apparatus is provided in a node. The multicast communication path calculation apparatus may be separate from the nodes that form the multicast network. In addition, the multicast communication path calculation apparatus and the multicast communication path setting apparatus may be included in one node.

(1) A multicast transfer apparatus (node) in the network collects network measurement information such as delay of data transfer on each link. (2) Then, each multicast transfer apparatus sends the network measurement information to the multicast communication path calculation apparatus and the multicast communication path setting apparatus. (3) When the need for setting multicast paths for transferring multicast data arises, the multicast communication path setting apparatus and the multicast communication path calculation apparatus performs setting of the multicast paths by performing after-mentioned processes. In the first embodiment, the multicast transfer apparatus has a capability for collecting network measurement information. The multicast communication path calculation apparatus has a capability for calculating the paths. The multicast communication path setting apparatus has capability for setting multicast paths on the network.

When the multicast communication path setting apparatus and the multicast communication path calculation apparatus are separate apparatuses, the multicast communication path setting apparatus requests the multicast communication path calculation apparatus to calculate the multicast paths. (4) When the multicast communication path setting apparatus and the multicast communication path calculation apparatus are the same apparatus, the multicast communication path setting apparatus instructs its path calculation module to calculate the paths. (5) Then, the path calculation module of the multicast communication path setting apparatus or the multicast communication path calculation apparatus calculates the multicast paths according to the collected information. (6) The calculation result is sent to a path setting module of the multicast communication path setting apparatus. (7) Then, the multicast communication path setting apparatus that receives the calculation result sets the multicast paths.

In the capability for collecting the network measurement information, the network measurement information is collected by using a protocol having functions for exchanging network measurement information between adjacent nodes, such as OSPF-TE (Open Shortest Path First-Traffic Engineering) and IS-IS-TE (Intermediate system-Intermediate system-Traffic Engineering) and the like.

The multicast communication path calculation apparatus includes a function for receiving network measurement information from a multicast transfer apparatus, a packet transfer function for sending the calculation result, a program for realizing an algorithm used for path calculation, a recording medium for storing the network measurement information, the path calculation program and path calculation result, and a path calculation function for realizing path calculation. The multicast communication path calculation apparatus may receive the network measurement information from the multicast communication path calculation apparatus instead of collecting the network measurement information by itself.

The path calculation program used in this embodiment has a function for calculating minimum delay paths from a source node to each destination node, a function for calculating delays from a candidate node to each destination node in which the candidate node exists on a path having the maximum delay among the minimum delay paths, and a function for selecting a rendezvous point node among candidate nodes.

According to the above-mentioned functions, time complexity for selecting a candidate node as the rendezvous point node can be decreased comparing with the method of document 2 according to this embodiment. In addition, according to the present embodiment, by selecting the rendezvous point node according to a selection criterion effective for decreasing delay variation, the delay variation can be decreased comparing with conventional multicast path calculation method in which minimum delay paths are selected as multicast paths.

In addition, according to the present embodiment, since the existing capability of collecting network measurement information can be used, the multicast paths can be calculated easily. It is easy for the multicast communication path calculation apparatus to obtain the network measurement information, and there is an advantage in that it is unnecessary to develop a new protocol to collect the network measurement information.

In the following, the multicast communication path calculation apparatus and the multicast communication path setting apparatus are described.

Figure 2:
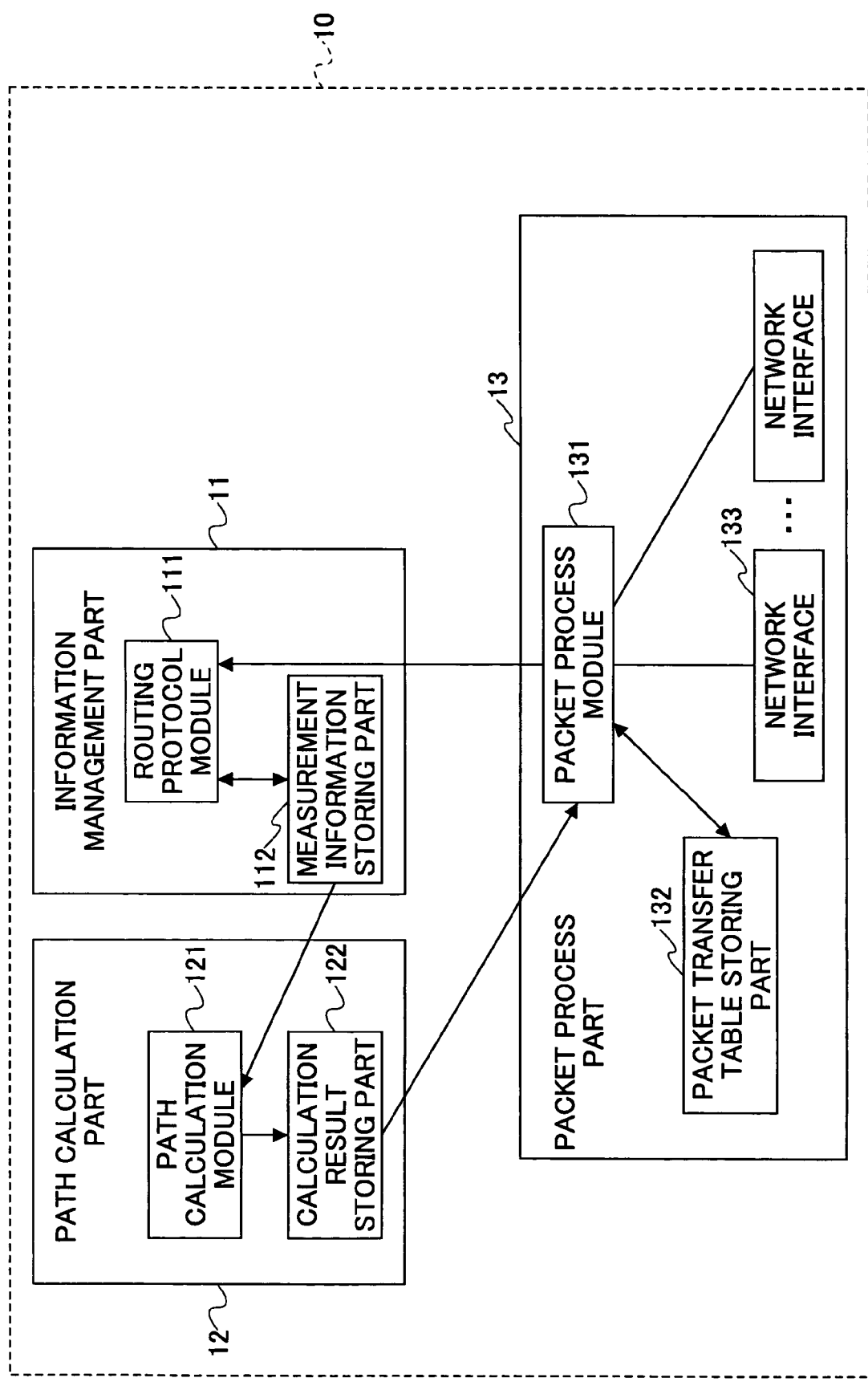
FIG. 2 is a block diagram of a multicast communication path calculation apparatus according to the first embodiment.

FIG. 2 is a block diagram of the multicast communication path calculation apparatus. In FIG. 2, the symbol 10 shows the multicast communication path calculation apparatus. The multicast communication path calculation apparatus 10 includes an information management part 11, a path calculation part 12 and a packet process part 13. The information management part 11 is for managing network measurement information on delay or cost arising in each node and each link between nodes in the network. The path calculation part 12 is for calculating multicast paths. The packet process part 13 is for processing packets to be sent or received. In addition, the packet process part 13 receives the network measurement information and a path calculation request, and sends calculation result to the multicast communication path setting apparatus.

The information management part 11 includes a routing protocol module 111 and a measurement information storing part 112. The routing protocol module 111 processes an information exchange protocol used in a routing protocol such as OSPF and IS-IS used for collecting information on traffic state and the like. The measurement information storing part 112 manages network measurement information, obtained by the protocol, such as topology, and delay or cost. In addition the path calculation part 12 includes a path calculation module 121 for calculating multicast paths and a calculation result storing part 122 for storing calculation results.

The packet process part 13 includes a packet process module 131, a packet transfer table storing part 132 and network interfaces 133. The packet process module 131 determines the type of an arriving packet, transfers the packet to another node or sends the packet to the information management part 11. The packet transfer table storing part 132 stores transfer destinations.

Figure 3:
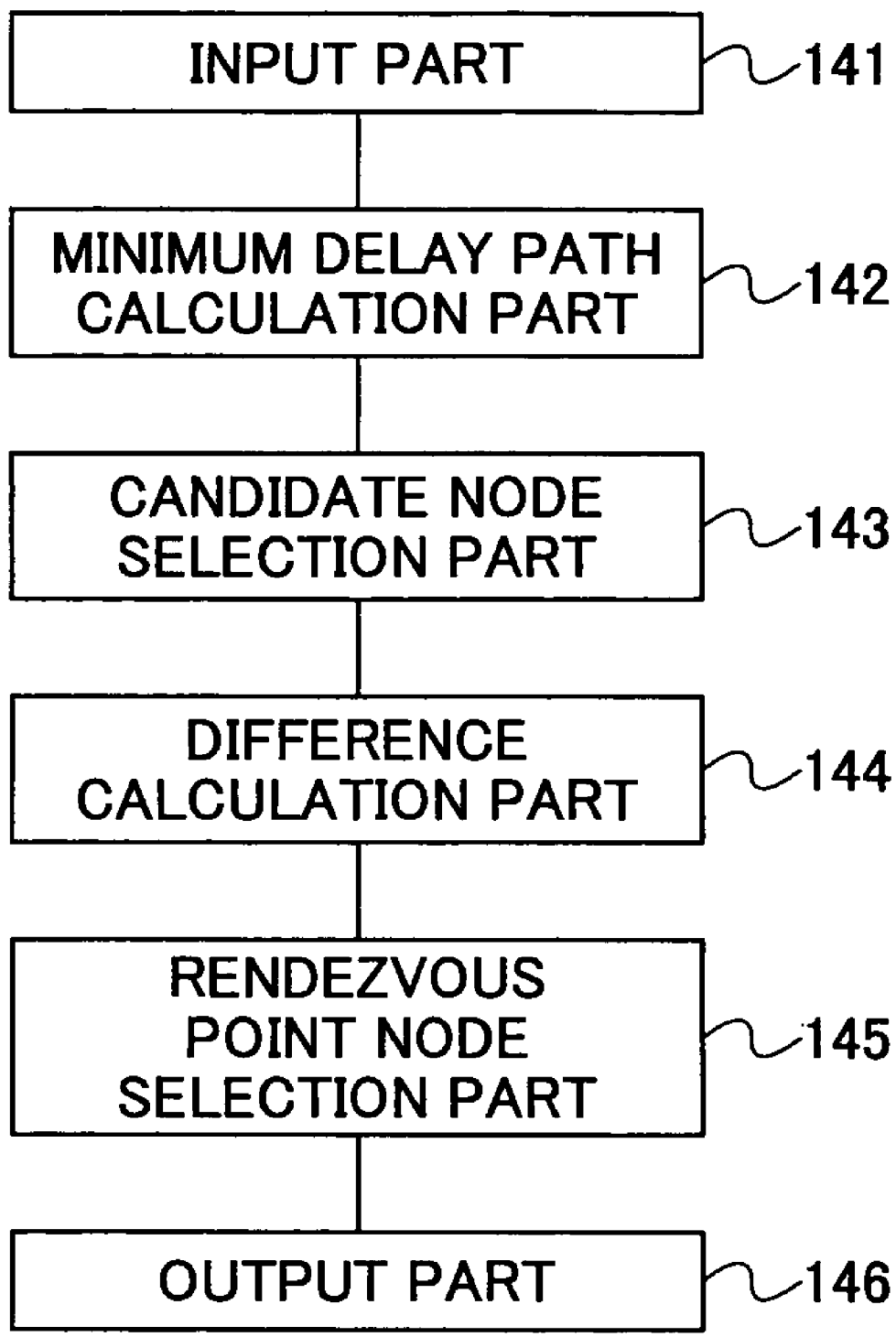
FIG. 3 shows a configuration example of a path calculation module 121 of the first embodiment.

FIG. 3 shows an example of a configuration of the path calculation module 121 of this embodiment. Functions of each part of the path calculation module 121 can be realized by hardware such as CPU and memory, and software.

As shown in FIG. 3, the path calculation module 121 includes an input part 141, a minimum delay path calculation part 142, a candidate node selection part 143, a difference calculation part 144, a rendezvous point node selection part 145, and an output part 146. The input part 141 receives topology information and delay information of the network. The minimum delay path calculation part 142 calculates minimum delay paths from a source node to each destination node by using the topology information and the delay information. The candidate node selection part 143 selects nodes, as candidate nodes of the rendezvous point node, that reside on a minimum delay path among the plurality of minimum delay paths from the source node to each destination node. The difference calculation part 144 calculates, for each of the candidate nodes, minimum delay paths from the candidate node to each destination node, and calculates, for each of the candidate nodes, a difference between the maximum value and the minimum value among delays of the calculated minimum delay paths. The rendezvous point node selection part 145 selects a candidate node, as the rendezvous point node, of which the calculated difference is smallest. The output part 146 outputs, as the multicast paths, a minimum delay path from the source node to the rendezvous point node and each minimum delay path from the rendezvous point node to each destination node.

The multicast communication path calculation apparatus 10 may be configured as a general computer, provided separately from the multicast network, including a CPU, memory, hard disc and the like. In this case, information necessary for path calculation is provided from the outside and the path calculation is performed by using a program for multicast communication path calculation.

Figure 4:
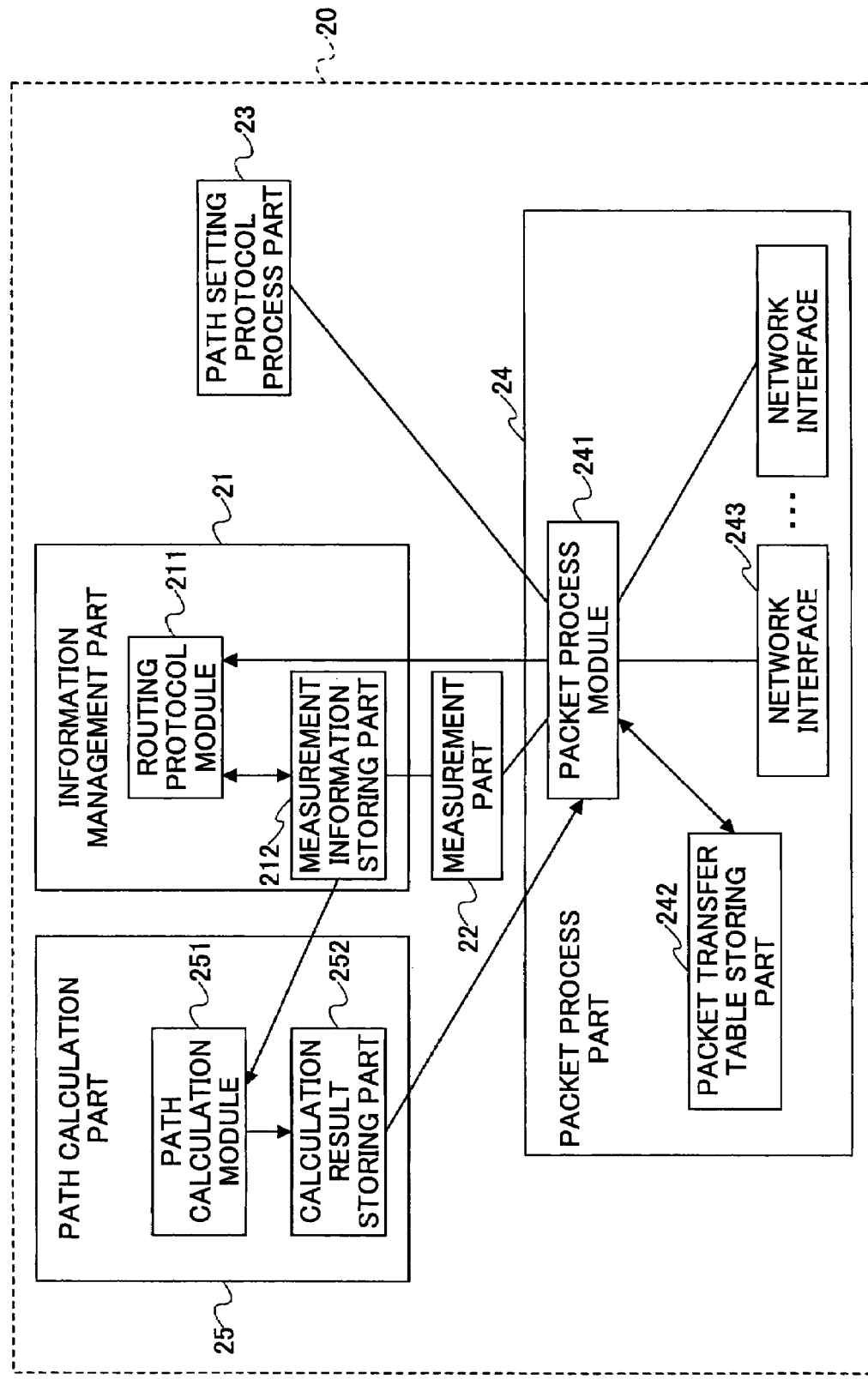
FIG. 4 shows a configuration of a multicast communication path setting apparatus according to the first embodiment.

FIG. 4 shows a configuration of the multicast communication path setting apparatus. In this figure, the symbol 20 shows the multicast communication path setting apparatus. The multicast communication path setting apparatus 20 includes an information management part 21, a measurement part 22, a path setting protocol process part 23 and a packet process part 24. The information management part 21 manages information of delay or cost that arises in nodes and links in the network. The measurement part 22 measures delay or cost arises in itself. The path setting protocol process part 23 performs path setting when new data flow arises, for example. The packet process part 24 processes arriving packets.

Basic structure of the information management part 21 is the same as that of the information management part 11 in the multicast communication path calculation apparatus 10, and includes a routing protocol module 211 and a measurement information storing part 212. The measurement part 22 includes a measurement module for measuring status of the network interfaces 243 and information such as delay of each node on the network. The packet process part 24 includes a packet process module 241, a packet transfer table storing part 242 for storing transfer destination of packets, and network interfaces 243. Th packet process module 241 determines types of arriving packets, transfers the packets and determines whether establishing a new path. In addition, the multicast communication path setting apparatus 20 includes a path calculation part 25. The path calculation part 25 includes a calculation process module 251 for calculating multicast paths, and a calculation result storing part 252 for storing the calculation result. In the case where the multicast communication path setting apparatus 20 performs calculation of multicast paths, the path calculation part 25 performs processes the same as those of the multicast communication path calculation apparatus 10. When the multicast communication path setting apparatus 20 does not perform calculation of multicast paths, the multicast communication path setting apparatus 20 may not include the path calculation part 25.

The path setting protocol process part 23 receives path setting request from the packet process part 24, and sends the request to the multicast communication path calculation apparatus 10. In addition, the path setting protocol process part 23 has a function for setting multicast paths in the network according to the calculation result received from the multicast communication path calculation apparatus 10.

When the multicast communication path calculation apparatus 10 and the multicast communication path setting apparatus 20 are included in the same node, the node includes each process part of the multicast communication path calculation apparatus 10 and the multicast communication path setting apparatus 20.

Next, operations of the multicast communication path calculation apparatus 10, the multicast communication path setting apparatus 20 and the multicast transfer apparatus are described.

The nodes in the network exchange, with adjacent nodes, network measurement information including topology and delay of the network. Each node stores the network measurement information obtained by the exchange operation.

The network measurement information includes not only information measured by its own node but also includes information measured by other nodes. According to the exchange operation, each node can obtain network measurement information of whole nodes of the network.

A node having the capability of the multicast communication path setting apparatus 20 sends a path calculation request to a node having the capability of the multicast communication path calculation apparatus 10. The node having the capability of the multicast communication path calculation apparatus 10 calculates the multicast paths by using the network measurement information managed by the information management part 11 and information of destination nodes sent from the node that sends the path calculation request.

Figure 5:
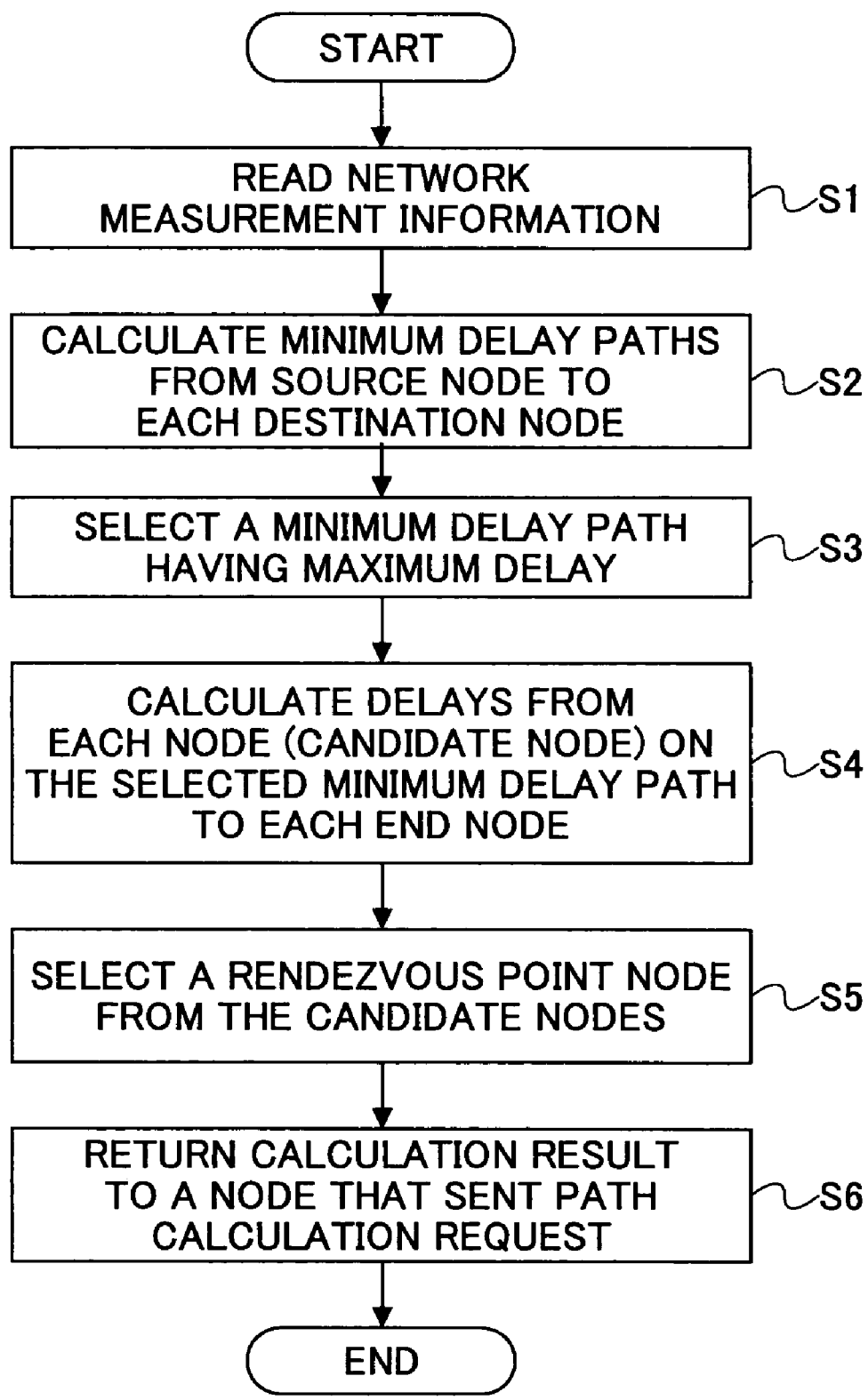
FIG. 5 is a flowchart showing processes for calculating paths in the multicast communication path calculation apparatus according to the first embodiment.

FIG. 5 is a flowchart showing processes for calculating multicast paths in the multicast communication path calculation apparatus 10.

First, the multicast communication path calculation apparatus 10 receives the path calculation request from the multicast communication path setting apparatus 20. At this time, the multicast communication path calculation apparatus 10 also receives information of the source node and the destination nodes from the multicast communication path setting apparatus 20. Then, the path calculation part 20 in the multicast communication path calculation apparatus 10 reads, from the measurement information storing part 112 in the information management part 11, the network measurement information indicating topology and traffic state of the network in step S1. Then, the path calculation module 121 calculates minimum delay paths between the source node to each destination node by using the network measurement information in step S2. More particularly, the path calculation module 121 calculates each minimum delay path between the source node that send the path calculation request and each destination node. For calculating the minimum delay path, Dijkstra's algorithm is used, for example.

Next, in step S3, the path calculation module of the multicast communication path calculation apparatus 10 selects a minimum delay path that has the maximum delay among the minimum delay paths calculated in step S2. Then, the path calculation module 121 calculates, for each node (referred to as candidate node) on the selected minimum delay path, data transfer delays from the node to each destination node in step S4. Then, the path calculation module 121 calculates, for each candidate node, a difference between the maximum delay and the minimum delay among delays calculated in step S4, and selects a candidate node by which smallest difference is calculated as the rendezvous point node in step S5. More particularly, in step S5, the difference δ between the maximum delay and the minimum delay for transferring data from a candidate node to each destination node is calculated for each candidate node, and the rendezvous point node is determined as a candidate node that has the minimum difference δ. Then, the path calculation module 121 returns the calculation result to the node that sent the path calculation request via the packet process part 13 in step S6, in which the calculation result indicates a path from the source node to the rendezvous point node and paths from the rendezvous point node to each destination node.

In this embodiment, for collecting the network measurement information such as delay by the multicast transfer apparatus, a communication protocol OSPF-TE is used. In the OSPF-TE, traffic information such as delay is included in topology information exchange information of OSPF that is a unicast routing protocol.

In addition, according to this embodiment, Multicast MPLS (Multi Protocol Label Switching) protocol is used as a protocol for setting multicast paths. The Multicast MPLS protocol is an extension of RSVP-TE (Resource Reservation Protocol-Traffic Engineering) for realizing explicit path designation. The Multicast MPLS is a technology in which information element is added, to RSVP-TE used in normal MPLS, in a message for generating LSP (Label Switched Path) for storing tree topology, so that Point-to-Multipoint LSP can be established according to the topology information.

In the following, a process example for calculating multicast paths according to this embodiment is described.

Figure 6:
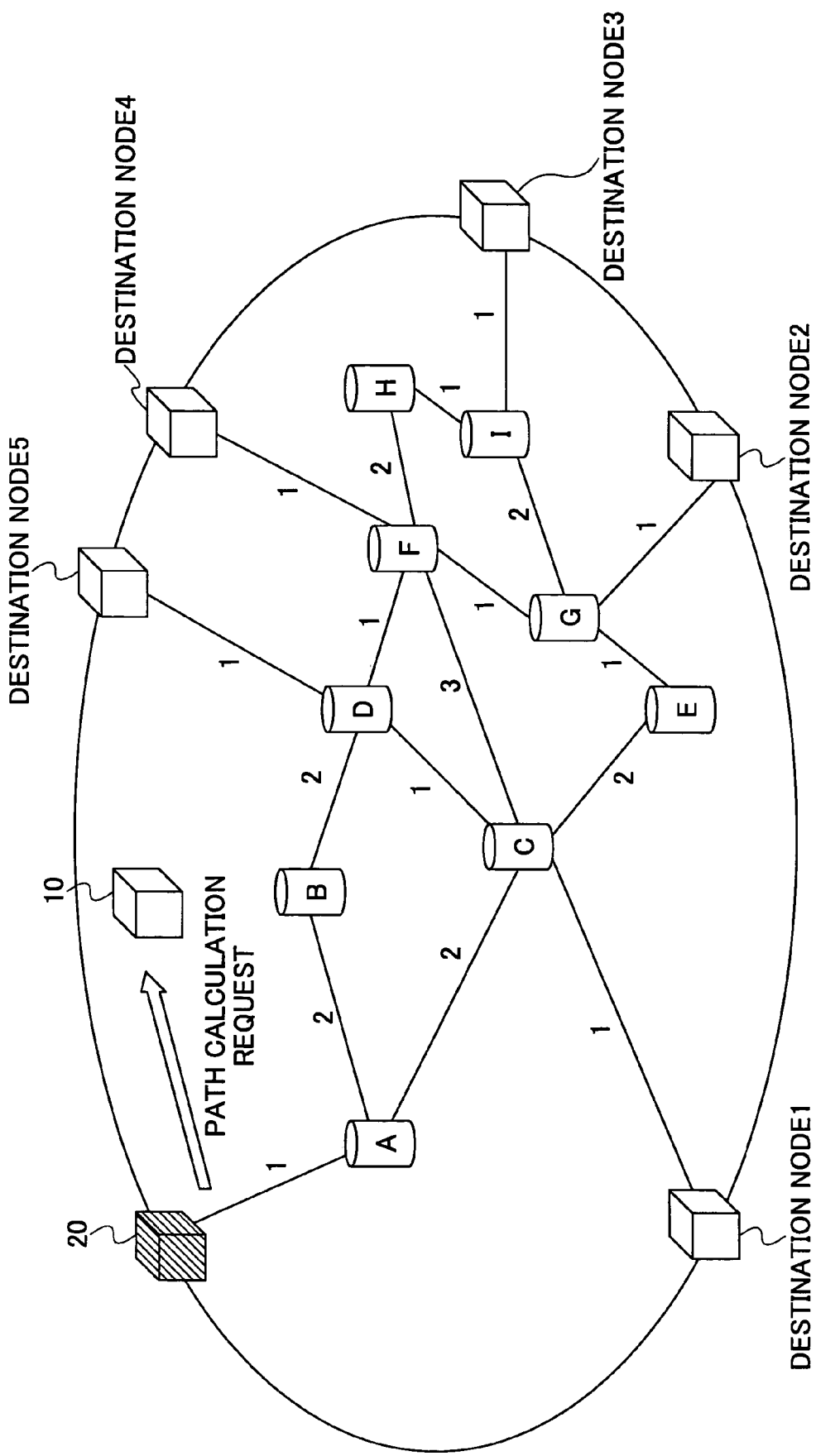
FIG. 6 shows an example of a multicast network according to the first embodiment.

FIG. 6 shows a multicast network. In this figure, symbols 1-5 show destination nodes. A-I indicate nodes existing between the source node and the destination nodes, and each node includes the capability of the multicast transfer apparatus. A multicast network is formed by the multicast communication path setting apparatus 20 (source node), the nodes A-I, and destination nodes 1-5 that are connected by communication lines. Each number shown on each link indicates a delay (cost) of the link.

The multicast communication path setting apparatus 20, that is a source node, transfers data to the destination nodes 1-5 according to the result calculated by the multicast communication path calculation apparatus 10. The network measurement information such as delay that arises in each link is collected by each node by using the before-mentioned OSPF-TE. The network measurement information is sent to the multicast communication path calculation apparatus beforehand.

Figure 7:
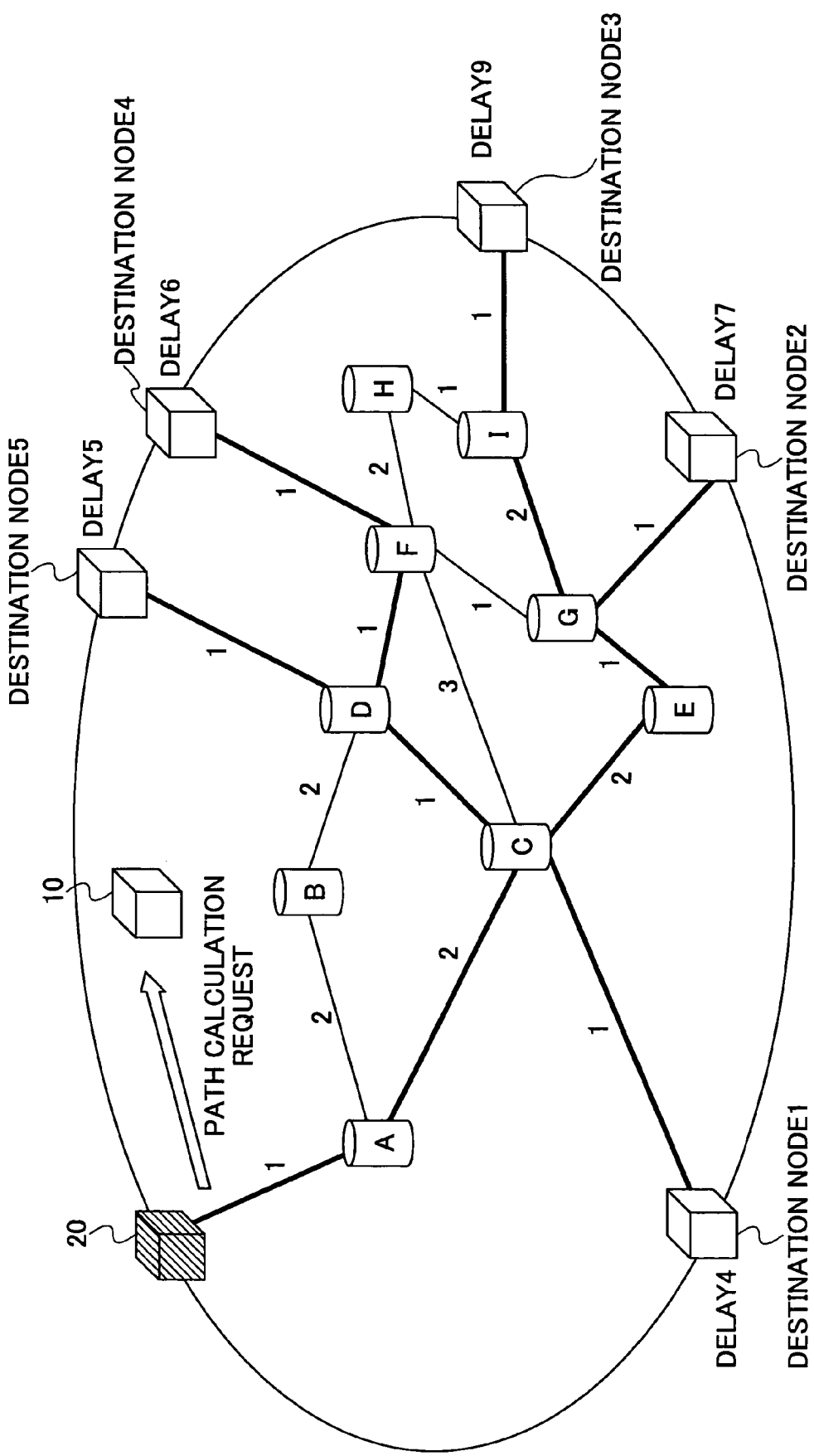
FIG. 7 shows minimum delay paths from a source node to each destination node.

FIG. 7 shows minimum delay paths from the source node to each destination node.

When the multicast communication path calculation apparatus 10 receives a path calculation request from the multicast communication path setting apparatus 20, the multicast communication path calculation apparatus 10 calculates the minimum delay paths from the source node (multicast communication path setting apparatus 20) to each destination node first. For calculating the minimum delay paths, the multicast communication path calculation apparatus 10 uses Dijkstra's algorithm. Dijkstra's algorithm is generally used for calculating a minimum delay path. The minimum delay paths calculated by the multicast communication path calculation apparatus 10 are, the multicast communication path setting apparatus 20→node A→node C→destination node 1, the multicast communication path setting apparatus 20→node A→node C→node E→node G→destination node 2, the multicast communication path setting apparatus 20→node A→node C→node E→node G→node I→destination node 3, the multicast communication path setting apparatus 20→node A→node C→node D→node F→destination node 4, and the multicast communication path setting apparatus 20→node A→node C→node D→destination node 5.

The delay for the source node→the destination node 1 is 4, the delay for the source node→the destination node 2 is 7, the delay for the source node→the destination node 3 is 9, the delay for the source node→the destination node 4 is 6, and the delay for the source node→the destination node 5 is 5. Therefore, the minimum delay path having the maximum delay is the minimum delay path from the source node to the destination node 3.

Next, the multicast communication path calculation apparatus 10 selects a rendezvous point node among nodes A, C, E, G and I on the minimum delay path from the source node to the destination node 3 having maximum delay among the minimum delay paths.

Figure 8:
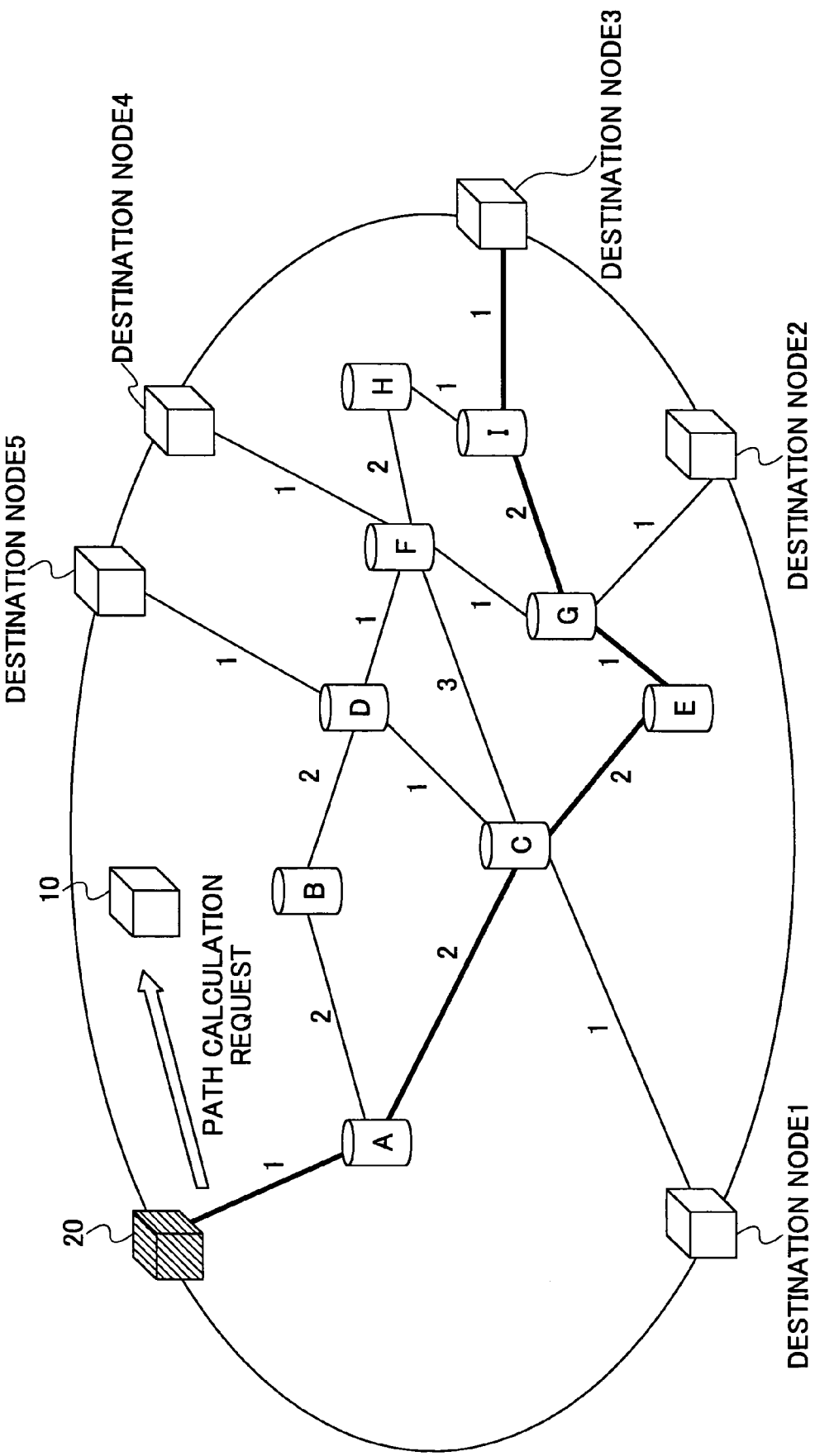
FIG. 8 shows paths connecting multicast communication path setting apparatus 20, nodes A, C, E, G, I and destination node 3.

FIG. 8 shows the minimum delay path connecting the source node, nodes A, C, E, G, I and destination node 3. In the following, the minimum delay path is called as a rendezvous point candidate path. In addition, the nodes A, C, E, G and I are called candidate nodes.

Next, the multicast communication path calculation apparatus 10 calculates, for each candidate node, minimum delay paths from the candidate node to each of destination nodes 1-5. For each candidate node n (n: n indicates a number of a candidate node), assuming that the maximum delay among delays of the calculated minimum delay paths is represented by Dmax(n) and the minimum delay is represented by Dmin (n), the multicast communication path calculation apparatus 10 calculates Dmax (A) and Dmin (A), Dmax (C) and Dmin (C), Dmax (E) and Dmin (E), Dmax (G) and Dmin (G), and Dmax (I) and Dmin (I).

For decreasing delay variation among users, it is necessary that a difference between Dmax and Dmin is small. Therefore, the multicast communication path calculation apparatus 10 selects a candidate node, as the rendezvous point node, by which difference between Dmax (n) and Dmin (n) is smallest. More particularly, the multicast communication path calculation apparatus 10 calculates each difference between Dmax (A) and Dmin (A), between Dmax (C) and Dmin (C), between Dmax (E) and Dmin (E), between Dmax (G) and Dmin (G), and between Dmax (I) and Dmin (I). Then, the multicast communication path calculation apparatus 10 selects a candidate node by which the difference is smallest as the rendezvous point node. As a result, since the candidate node by which the difference between Dmax (n) and Dmin (n) is minimum is the node E, the multicast communication path calculation apparatus 10 selects the node E as the rendezvous point node. Delay from the node E to the destination node 1 is 3, delay from the node E to the destination node 2 is 2, delay from the node E to the destination node 3 is 4, delay from the node E to the destination node 4 is 3, and delay from the node E to the destination node 5 is 4. Therefore, variation of delays from the rendezvous point node to each destination node is within a range 2-4.

Figure 9:
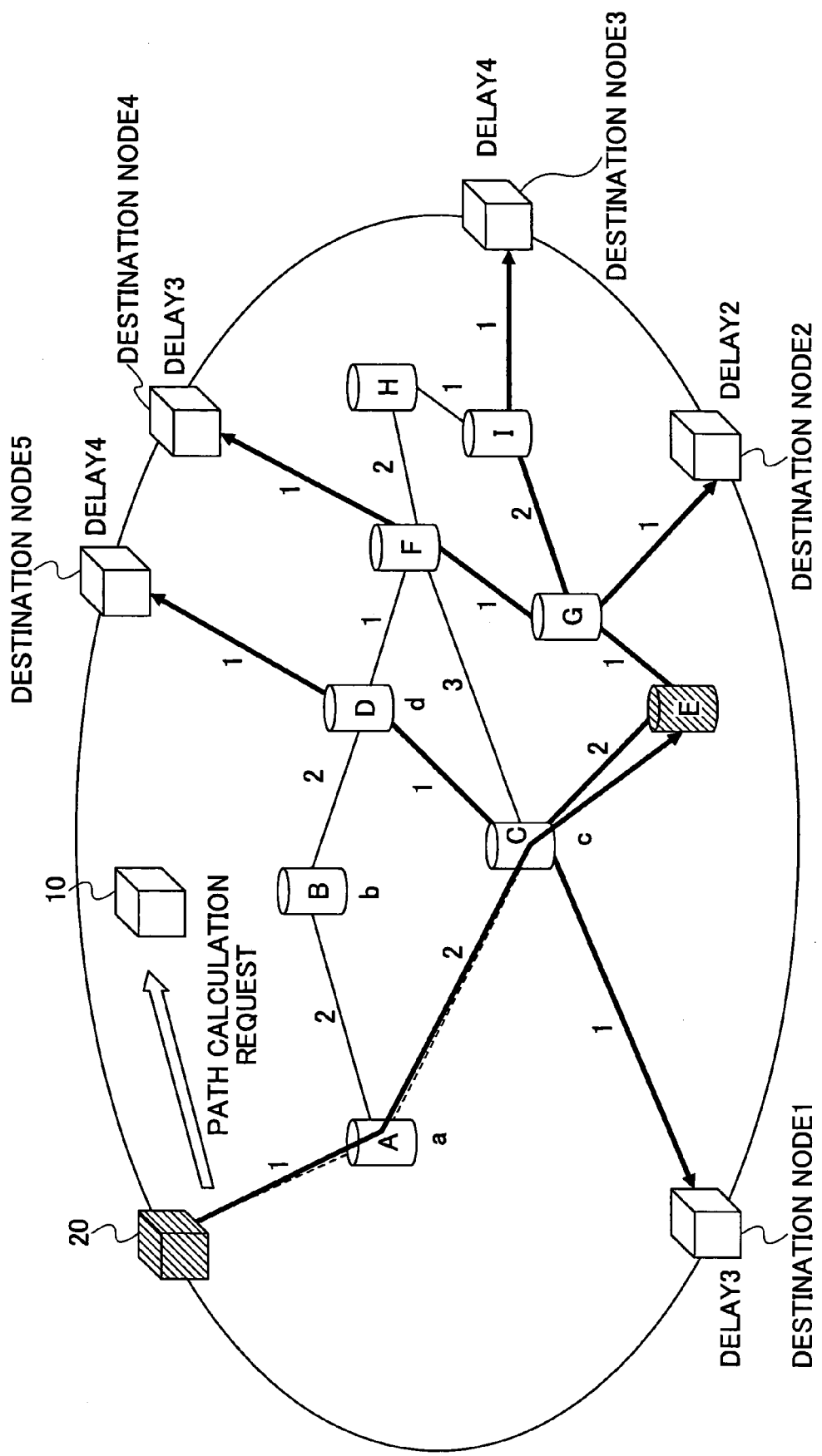
FIG. 9 shows a minimum delay path from the multicast communication path setting apparatus 20 to the node E and minimum delay paths from the node E to each destination node 1-5.

The multicast communication path calculation apparatus 10 prepares, as the multicast communication paths, a minimum delay path from the multicast communication path setting apparatus 20 to the node E and minimum delay paths from the node E to each destination node 1-5. Then, the multicast communication path calculation apparatus 10 sends the calculation result to the multicast communication path setting apparatus 20. FIG. 9 shows the minimum delay path from the multicast communication path setting apparatus 20 to the node E and minimum delay paths from the node E to each destination node 1-5. Data are transferred from the multicast communication path setting apparatus 20 to each destination node via the node E that is the rendezvous point node. Next, the multicast communication path setting apparatus 20 that receives information of the multicast communication paths includes the information of the multicast communication paths into a transfer path setting control message, and establishes the multicast paths by using the multicast MPLS that is a protocol for setting paths and is an extended protocol of RSVP-TE. Then, the multicast communication path setting apparatus 20 transfers data via the multicast paths after establishing the multicast paths.

The time complexity O of Dijkstra's algorithm is generally $n^2$ if the number of nodes is n. Since the multicast paths are calculated by applying Dijkstra's algorithm to each of n nodes according to the conventional technology, the time complexity is $O=n^3$ according to the conventional technology. However, according to the present invention, since Dijkstra's algorithm is applied to p nodes (p<n) on a minimum delay path between the source node and an destination node, the time complexity is $O=pn^2$. Therefore, compared with the conventional technology, the time complexity can be decreased.

Each of the multicast communication path calculation apparatus and the multicast communication path setting apparatus includes a computer system in the inside. The above-mentioned processes of this embodiment can be realized by reading a program from a computer readable medium and executing the program. The computer readable medium may be a magnetic disk, an optical magnetic disk, a CD-ROM, a DVD-ROM, a semiconductor memory and the like. The computer program can be delivered to a computer via a communication line, and the computer can function as the multicast communication path calculation apparatus or the multicast communication path setting apparatus.

As mentioned above, by adopting a system including a node for calculating paths that can executes the path calculation algorithm in consideration of the delay variation among users, delays can be equalized among users. Accordingly, a service can be provided for satisfying fairness of among users on delay, which was difficult according to the conventional technology. In addition, according to the present embodiment, faster calculation time can be achieved comparing with a conventional apparatus that provide a service for satisfying fairness among users on delay. Accordingly, path setting time can be decreased.

Second Embodiment

In the following, the second embodiment of the present invention is described with reference to figures.

In the second embodiment, the calculation algorithm for calculating the multicast paths is different from that of the first embodiment. The other configurations can be the same as those of the first embodiment.

Figure 10:
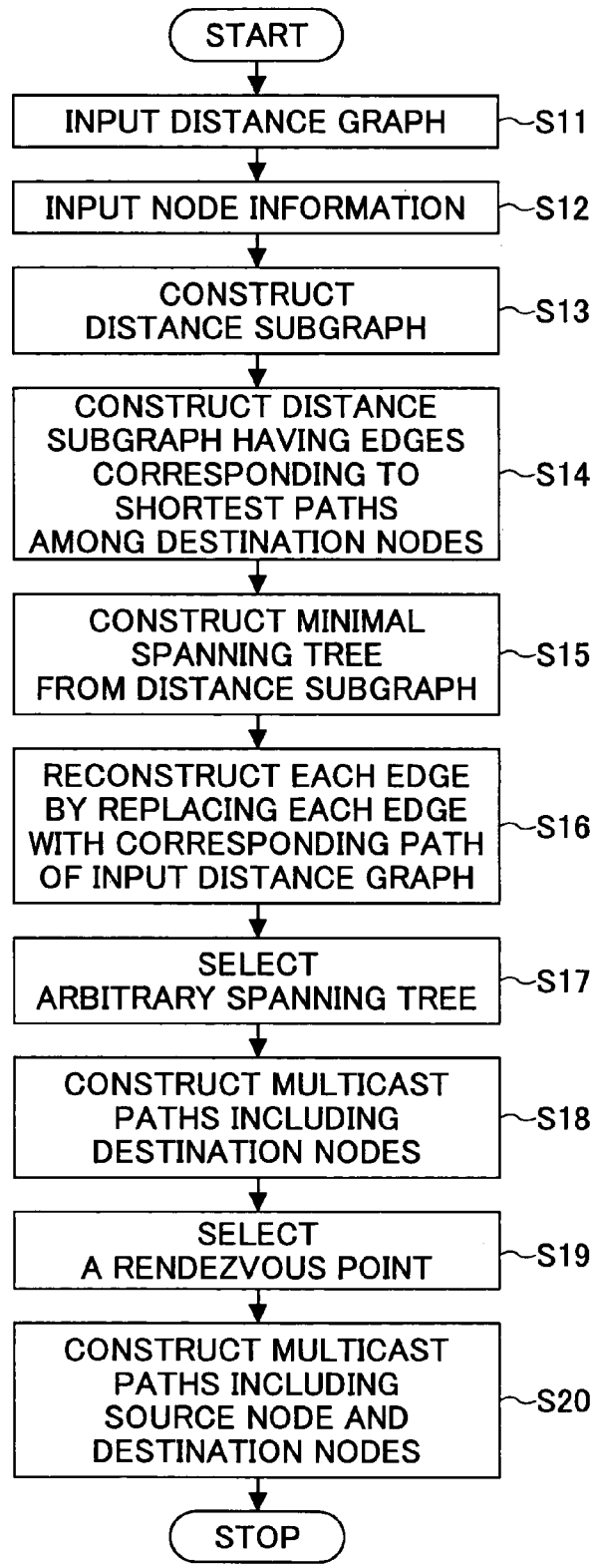
FIG. 10 shows an outline of the procedure for multicast communication path calculation according to the second embodiment.

FIG. 10 shows an outline of the procedure of the multicast communication path calculation method according to the second embodiment.

First, a distance graph is input into the multicast communication path calculation apparatus in step S11, in which the distance graph represents multicast network topology and network transfer cost by using link information connecting between nodes and transfer cost information necessary for transferring data on the link. Instead of inputting the distance graph from the outside, the distance graph can be collected in the apparatus beforehand and can be read from a recording medium in the apparatus.

Next, source node information and destination node group information are input in step S12. From the input information, a first distance subgraph is established in which the source node is deleted in step S13.

After that, the destination node group is selected from the first distance subgraph, and a second distance subgraph is constructed that is formed by edges corresponding to shortest paths among the destination nodes in step S14. Then, a minimal spanning tree is constructed from the second distance subgraph in step S15. At this time, if a plurality of minimal spanning trees exist, pick an arbitrary one.

Then, each edge that corresponds to a shortest path in the minimal spanning tree is reconstructed into a path formed by nodes of the input distance graph, so that a subgraph is constructed in step S16. Then, a minimal spanning tree is constructed again from the reconstructed subgraph in step S17. If there are a plurality of spanning trees, pick an arbitrary one. From the constructed spanning tree, unnecessary edges are deleted such that all destination nodes becomes a part of the spanning tree, so that multicast paths including all destination nodes is established in step S18.

Nodes in the constructed multicast paths are candidate nodes of a rendezvous point node. Then, for each candidate node, distances from a candidate node to each destination node are calculated, and a difference between the maximum distance and the minimum distance in the distances is calculated. Then, a candidate node is selected as the rendezvous point node in which the difference is minimum among the candidate nodes in step S19. Then, the multicast paths formed by the destination nodes is connected to the source node at the rendezvous point node, and multicast paths including the source node and all destination nodes are constructed in step S20.

Figure 11:
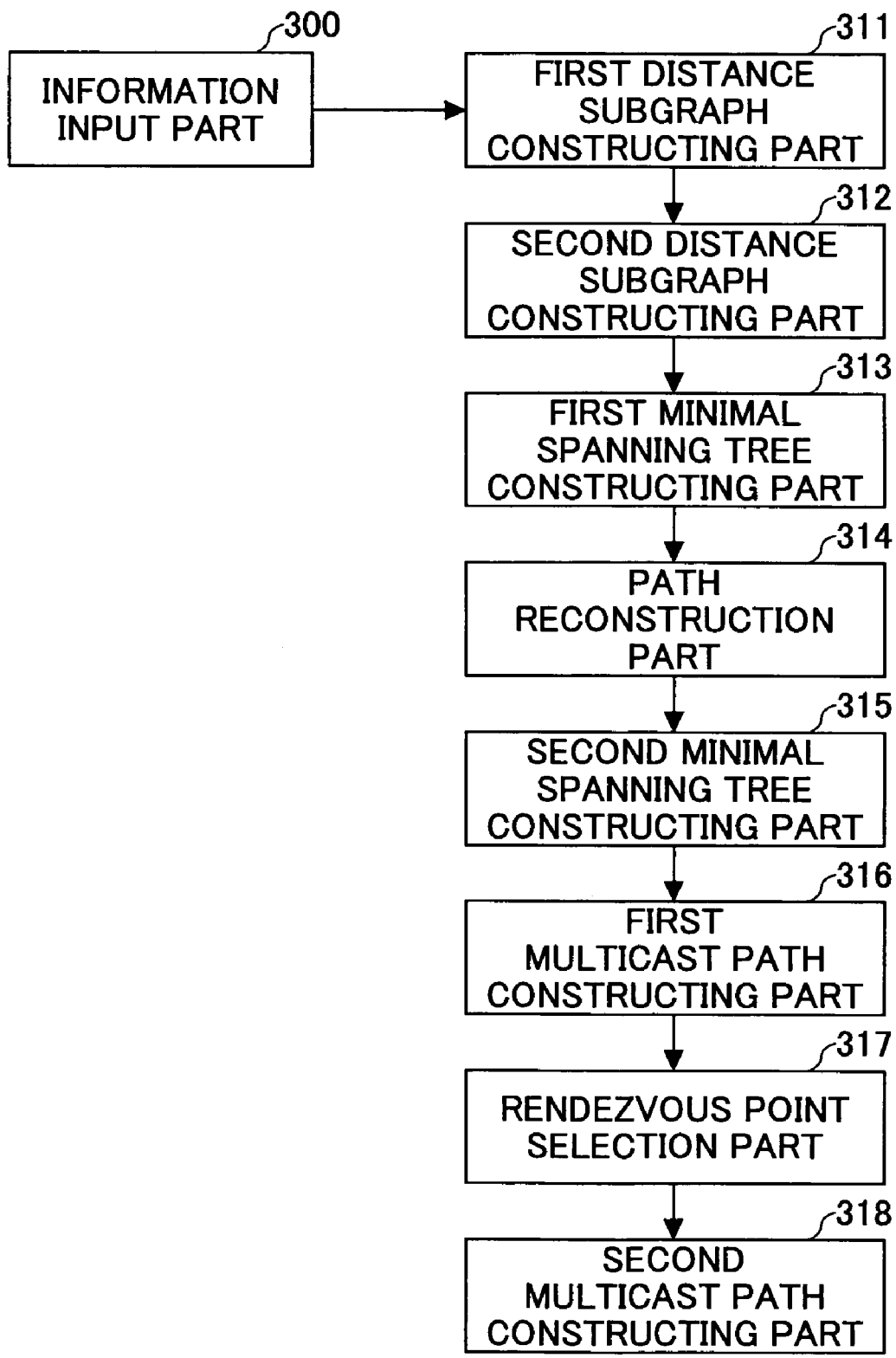
FIG. 11 shows a configuration of a path calculation module of the multicast communication path calculation apparatus according to the second embodiment.

FIG. 11 shows a configuration of a path calculation module of the multicast communication path calculation apparatus according to the second embodiment of the present invention.

The path calculation module shown in FIG. 11 includes an information input part 300, a first distance subgraph constructing part 311, a second distance subgraph constructing part 312, a first minimal spanning tree constructing part 313, a path reconstruction part 314, a second minimal spanning tree constructing part 315, a first multicast path constructing part 316, a rendezvous point selection part 317, and a second multicast communication path constructing part 318.

The information input part 300 receives the distance graph, in which the distance graph represents multicast network topology and network transfer cost by using link information connecting between nodes and transfer cost information necessary for transferring data on the link. In addition, the information input part 300 receives source node information and destination node group information. The network transfer cost in the second embodiment corresponds to "delay" in the first embodiment.

The first distance subgraph constructing part 311 constructs a first distance subgraph in which the source node is deleted from the input distance graph.

The second distance subgraph constructing part 312 selects the destination node group from the first distance subgraph, and constructs a second distance subgraph that is formed by shortest paths each between two nodes in the destination node group.

The first minimal spanning tree constructing part 313 constructs a minimal spanning tree from the second distance subgraph, at this time, if a plurality of minimal spanning trees exist, pick an arbitrary one.

The transfer path reconstruction part 314 reconstructs each edge that corresponds to a shortest path in the minimal spanning tree into a path formed by nodes of the input distance graph, so that a subgraph is established.

The second minimal spanning tree constructing part 315 constructs a minimal spanning tree again from the subgraph reconstructed by the transfer path reconstruction part 314. If there are a plurality of spanning trees, pick an arbitrary one.

The first multicast communication path constructing part 316 deletes unnecessary edges from the constructed spanning tree such that all destination nodes becomes a part of the spanning tree so that multicast paths including all destination nodes is established.

Nodes in the multicast paths are candidate nodes of a rendezvous point node. The rendezvous point selection part 317 calculates, for each candidate node, transfer distances from a candidate node to each destination node, and calculates a difference between the maximum distance and the minimum distance in the transfer distances. Then, the rendezvous point selection part 317 selects a candidate node as the rendezvous point node in which the difference is minimum among the candidate nodes.

The second multicast communication path constructing part 318 connects the constructed multicast paths formed by the destination nodes to the source node at the rendezvous point node so as to establish multicast paths including the source node and all destination nodes.

In the following, the procedure for calculating the multicast paths according, to this embodiment is described in detail. In this embodiment, the following information is input from the measurement result storing part, for example. The following information can be collected as the network measurement information by using the existing protocol described in the first embodiment.

(1) One directed distance graph that describes topology of the whole network: G=(V,E,d), wherein V: nodes, E: links (edges) between nodes, d: costs of links (corresponding to delay of the first embodiment)

(2) Multicast traffic source node: s ($\subseteq$V)

(3) Multicast traffic destination nodes (destination node group): S ($\subseteq$V)

By inputting the above information, multicast communication paths: T is output by performing following calculation.

Figure 12:
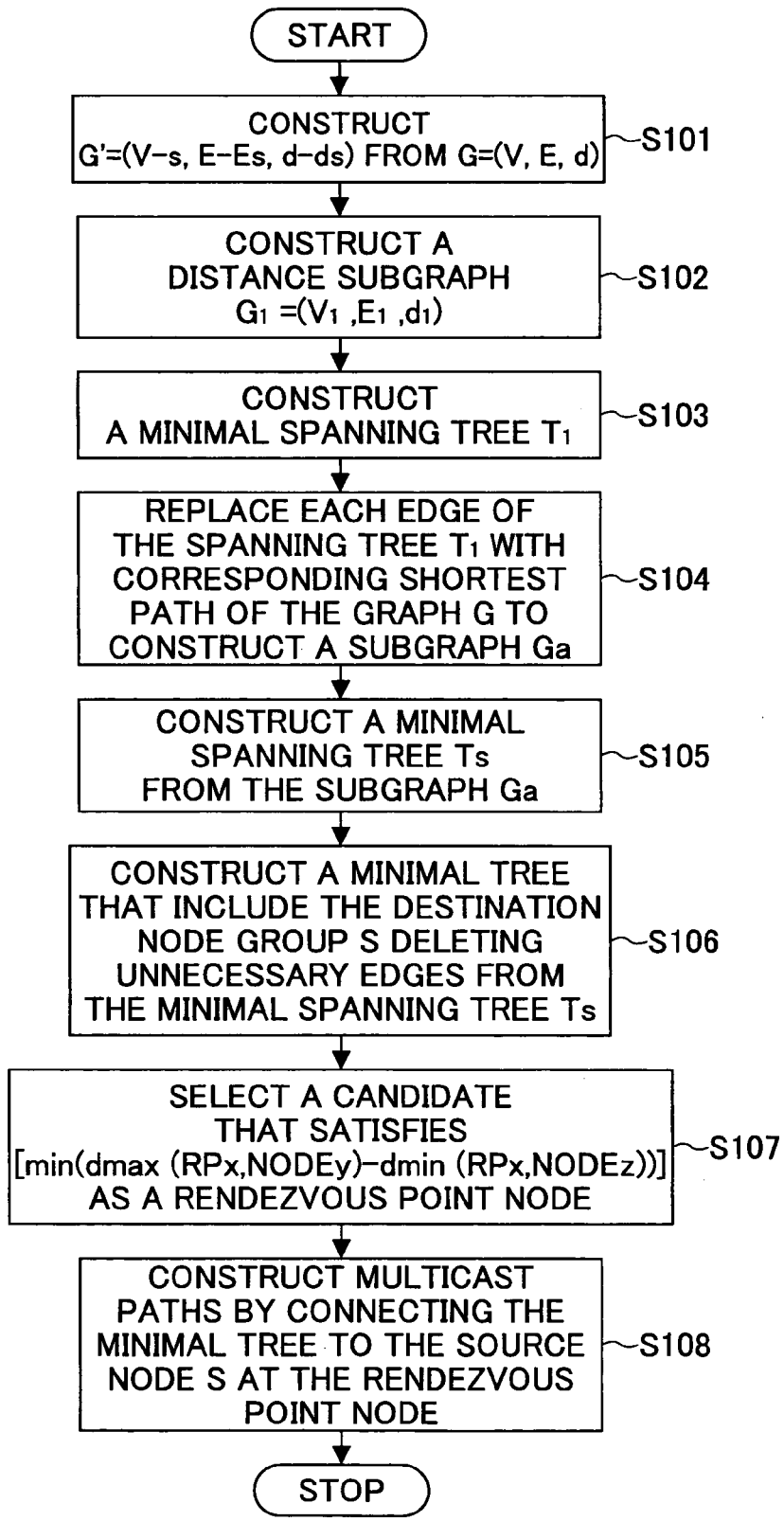
FIG. 12 is a flowchart of the multicast communication path calculation method according to the second embodiment.

FIG. 12 is a flowchart of the multicast communication path calculation method according to the second embodiment.

Step 101) A subgraph G'=(V-s,E-Es,d-ds) is constructed by deleting the source node from the input graph G=(V,E,d).

Step 102) The destination node group S is selected from the subgraph G, and a distance subgraph G1=(V1, E1, d1) is constructed, wherein the distance subgraph G1=(V1, E1, d1) is formed by the destination node group S and shortest paths each between two nodes in the destination node group S.

Step 103) A minimal spanning tree T1 is constructed from the distance subgraph G1. When there exist a plurality of spanning trees, arbitrary spanning tree is selected.

Step 104) By replacing each edge of the spanning tree T1 with corresponding shortest path in the graph G, a subgraph Ga is constructed. When there exist a plurality of shortest paths, arbitrary one is selected.

Step 105) A minimal spanning tree Ts is constructed from the subgraph Ga. When there exist a plurality of minimal spanning trees, arbitrary one is selected.

Step 106) Multicast paths that include the destination node group S are constructed by deleting unnecessary edges from the minimal spanning tree Ts such that all destination nodes are included.

Step 107) Nodes that forms the multicast paths constructed in step 106 are selected as candidates of a rendezvous point (RP) node. Then, distances d(RPx,NODEy) between RPx and each destination node are calculated, and a difference between dmax and dmin is calculated in which dmin is a shortest distance from RPx to the destination node, and dmin is a longest distance from RPx to the destination node. The distance d(RPx,NODEy) can be shortest distance between RPx and NODEy. Then, a candidate by which the difference is the smallest is selected as the rendezvous point (RP) node. That is, a candidate that satisfies [min(dmax (RPx,NODEy)–dmin (RPx,NODEz))] is selected as the rendezvous point node.

Step 108) The multicast communication paths constructed in step 106 is connected to the source node s via the rendezvous point node, so that multicast paths including the source node s and the destination node group S are constructed.

Figure 13:
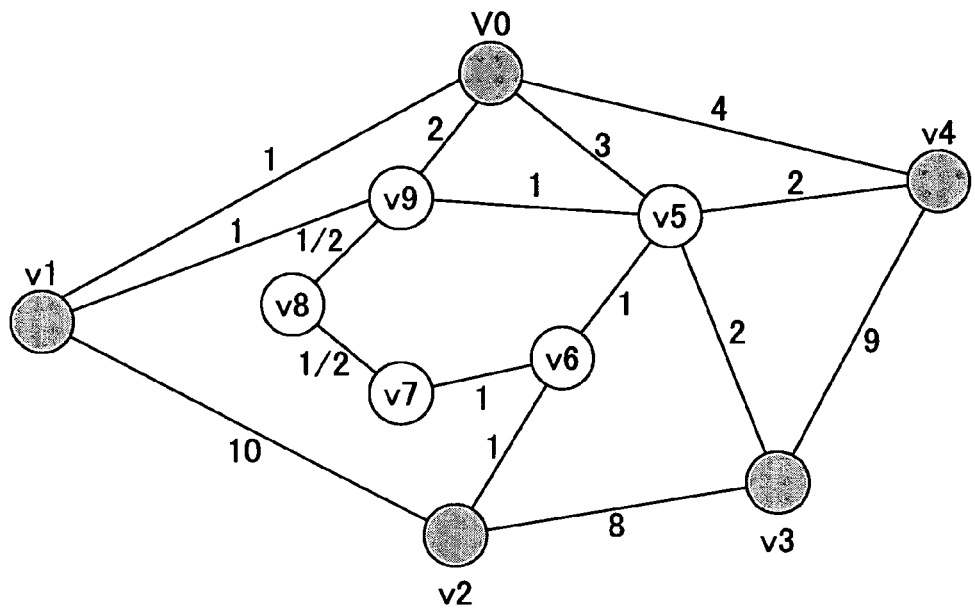
FIG. 13 shows an example of a network graph to which the procedure of the second embodiment is applied.

In the following, an example for calculating the multicast paths by using the above-mentioned procedure is described. FIG. 13 shows a network graph of a multicast network to which the procedure is applied in this example.

FIG. 13 shows a network formed by 10 nodes from V0 to V9. Each node is connected by a link, and the number on each link shows a transfer cost. For example, since 1 is assigned to the link between the node V0 and the node V1, the transfer cost for transferring data from the node V0 to the node V1 is 1.

For constructing the multicast communication paths from the source node V0 to the destination node group V1, V2m V3 and V4, following calculation procedure is performed according to the second embodiment.

Figure 14:
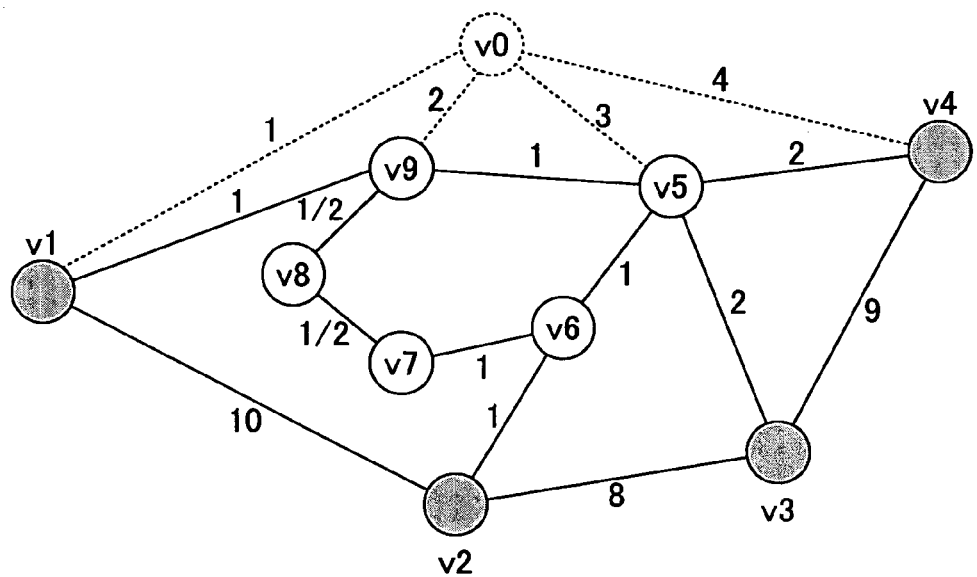
FIG. 14 shows a network graph in which the source node is excluded.

When the path calculation module receives network graph information of FIG. 13 and source node information V0 and destination node group information V1, V2, V3 and V4, the node V0 and links V0V1, V0V9 and V0V4 that are connected to V0 are deleted from the input graph. FIG. 14 shows the network graph in which the source node and the links are deleted. That is, FIG. 14 shows a network graph after performing the process of step 101.

Figure 15:
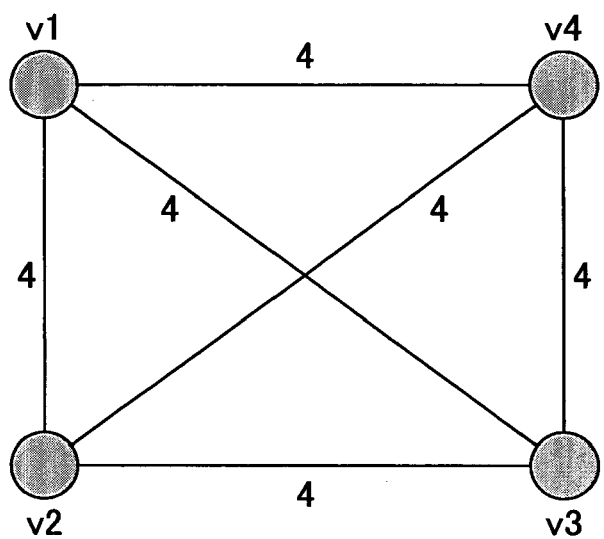
FIG. 15 shows a shortest path graph among destination nodes.

Then, a shortest path graph among destination nodes is constructed by the step 102. FIG. 15 shows the result of step 102.

Figure 16:
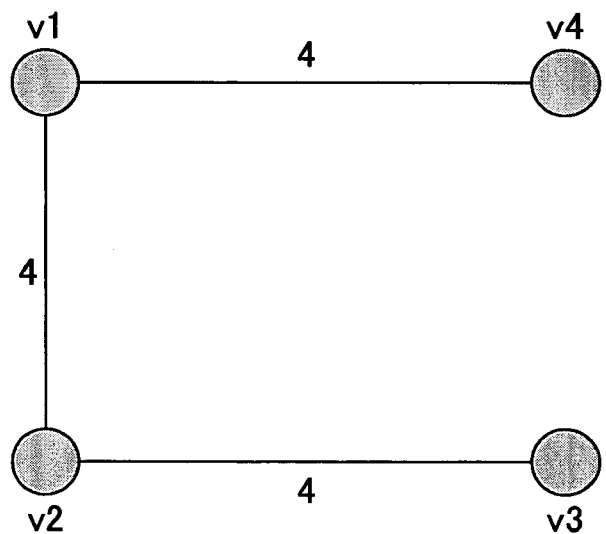
FIG. 16 is a minimal spanning tree obtained from the shortest path graph among destination nodes.
Figure 17:
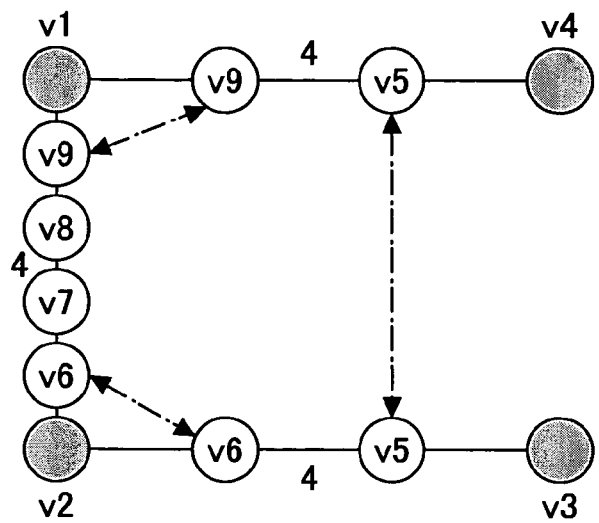
FIG. 17 shows an intermediate result for constructing a minimal spanning tree considering intermediate nodes.
Figure 18:
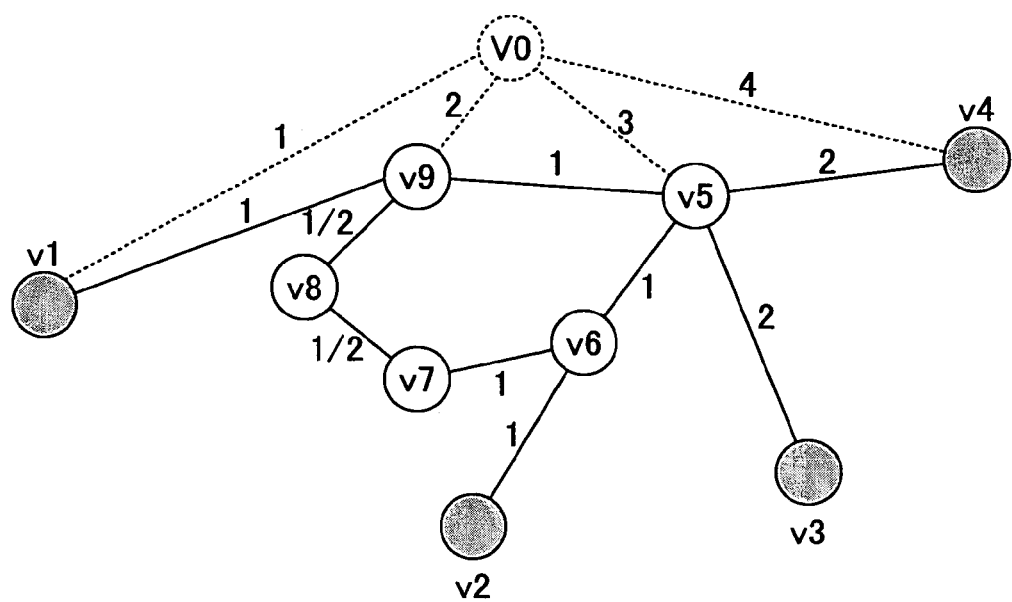
FIG. 18 shows a subgraph that forms a minimal spanning tree considering intermediate nodes.

After that, by the step 103, the minimal spanning tree formed by edges that are shortest paths among destination nodes is constructed. FIG. 16 shows the result. After that, each edge forming the spanning tree is replaced by original path of the input graph. FIG. 17 shows an intermediate result of the process. FIG. 18 shows the result. As shown in the figure, since the shortest path between the node V1 and the node V4 is formed by nodes V1V9V5V4, the nodes V9 and V5 are inserted between V1 and V4. In the same way, nodes that forms the shortest paths are inserted between nodes V1 and V2 and between nodes V2 and V3. In this example, since the nodes V9, V6 and V5 are overlapping for a plurality of paths, the subgraph shown in FIG. 18 is obtained by shaping the graph in consideration of actual physical connections.

Figure 19:
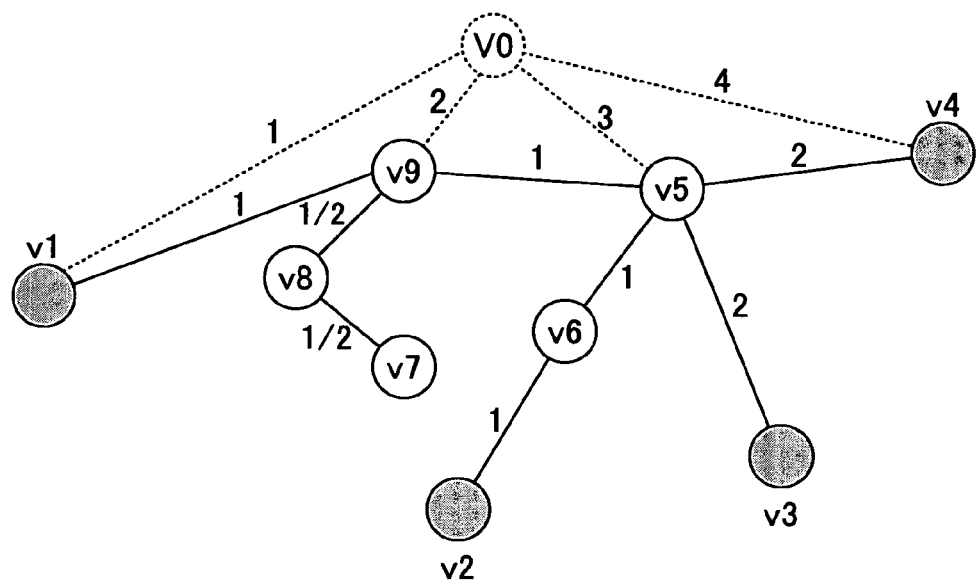
FIG. 19 shows minimal spanning tree of the subgraph.

After that, by the step 105, a minimal spanning tree (Ts) is formed from the subgraph shown in FIG. 18. FIG. 19 shows the result.

Figure 20:
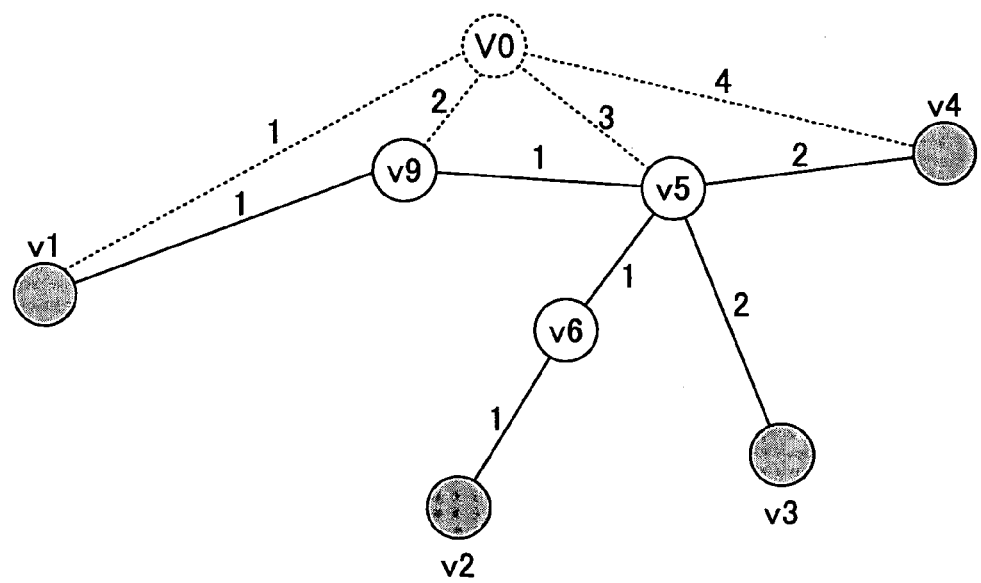
FIG. 20 is a minimal tree including destination nodes.

Then, by the step 106, multicast paths (a minimal tree) that include the destination nodes are established by deleting unnecessary edges such that the destination nodes are included in the multicast paths. The result is shown in FIG. 20. As shown in FIG. 20, a minimal tree V1V9V5V6V2V3V4 including the destination nodes V1, V2, V3 and V4 is formed.

Figure 21:
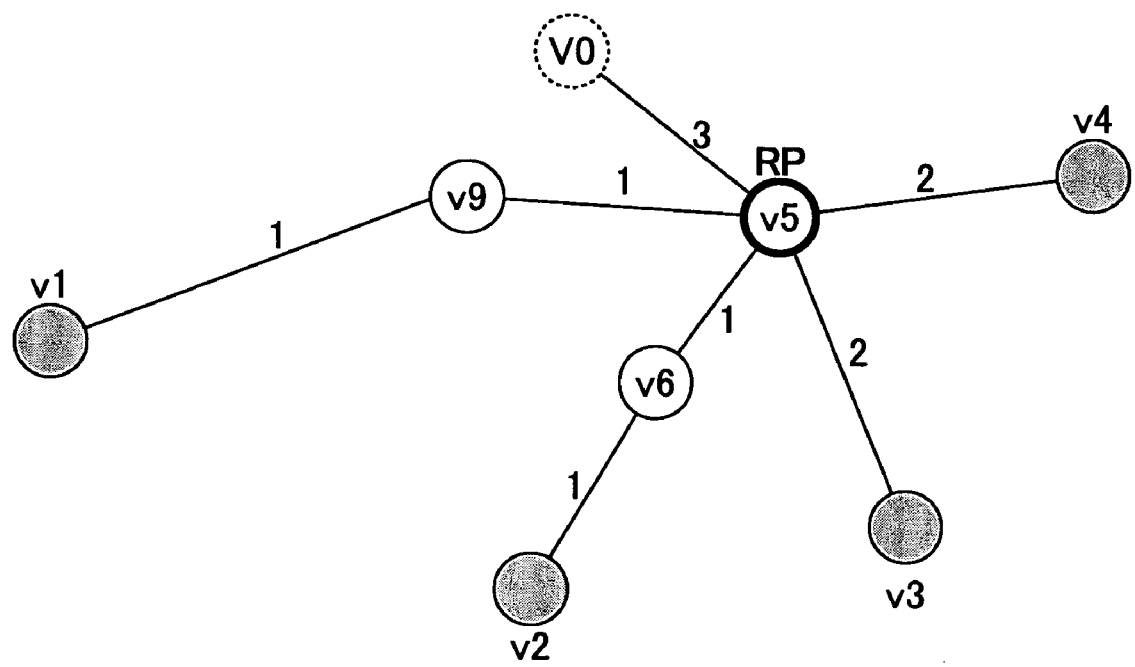
FIG. 21 shows multicast paths from the source node to each destination node in which a rendezvous point node is provided.

After that, by the step 107, a rendezvous point node is selected among nodes in the minimal tree such that variation of transfer distances to each node becomes minimum. For selecting the rendezvous point node, every node that forms the minimal tree is a candidate of the rendezvous point node. For each candidate, transfer distances from the candidate to each destination node are calculated, and a difference of the maximum distance and the minimum distance in the transfer distances are obtained. In the example of FIG. 20, when the node V9 is a candidate of the rendezvous point node, since distances are as follows:

RP·V1=1,
RP·V2=3,
RP·V3=3,
RP·V4=2, the difference between the maximum distance (dmax) and the minimum distance (dmin) is 2. In the example of FIG. 21, determining that the node V5 is RP, every transfer distance from RP to the destination nodes V1, V2, V3 and V4 is 2. This means that the node V5 is the optimal rendezvous point in which the difference is 0.

In addition, by step 108, the source node V0 is connected to the rendezvous point node so that optimal multicast paths from the source node to the destination nodes are constructed.

Figure 22:
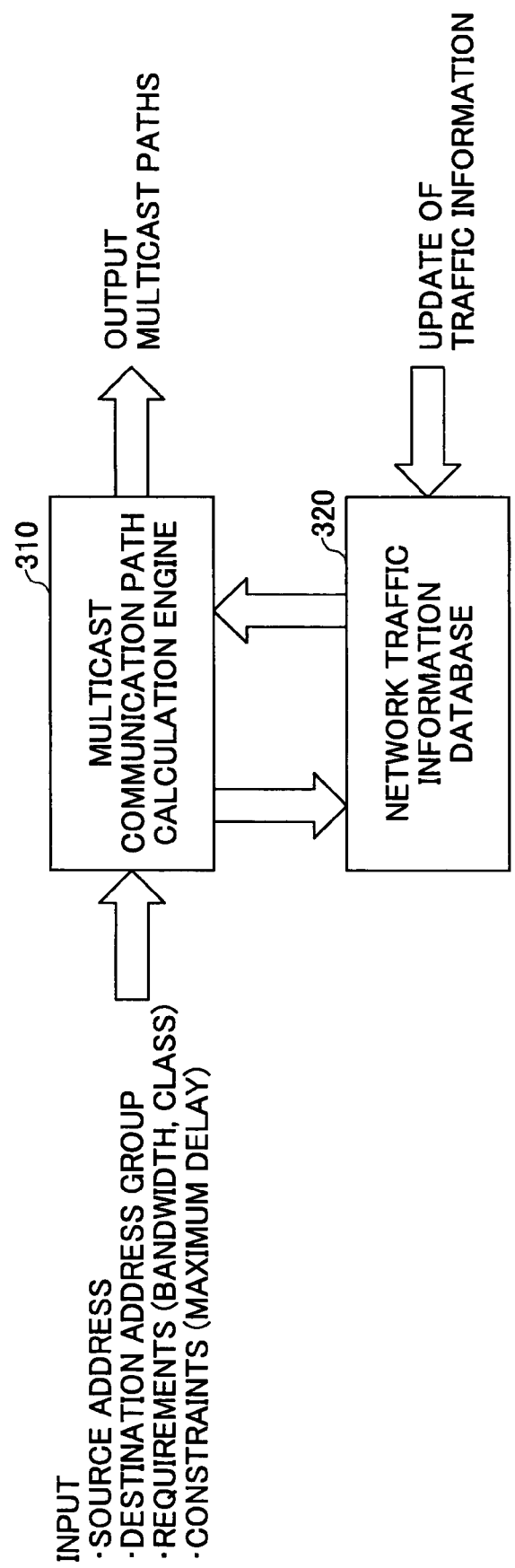
FIG. 22 shows a configuration example of a multicast communication path calculation system according to the second embodiment.

FIG. 22 shows a configuration example of a multicast communication path calculation system according to the second embodiment. That is, the system can be configured not only as shown in FIG. 1 but also as shown in FIG. 22. The system shown in FIG. 22 performs the above-mentioned multicast calculation procedure.

The network traffic information database 120 collects network traffic information by using a routing protocol. The multicast calculation engine 310 receives node information, destination node group information, requirements and constraints. Then, the multicast calculation engine 310 calculates and outputs the optimal multicast paths by using the network traffic information database 120 according to the calculation method shown in FIG. 11.

In the following, an example showing performance of the calculation method of this embodiment is described.

Figure 23:
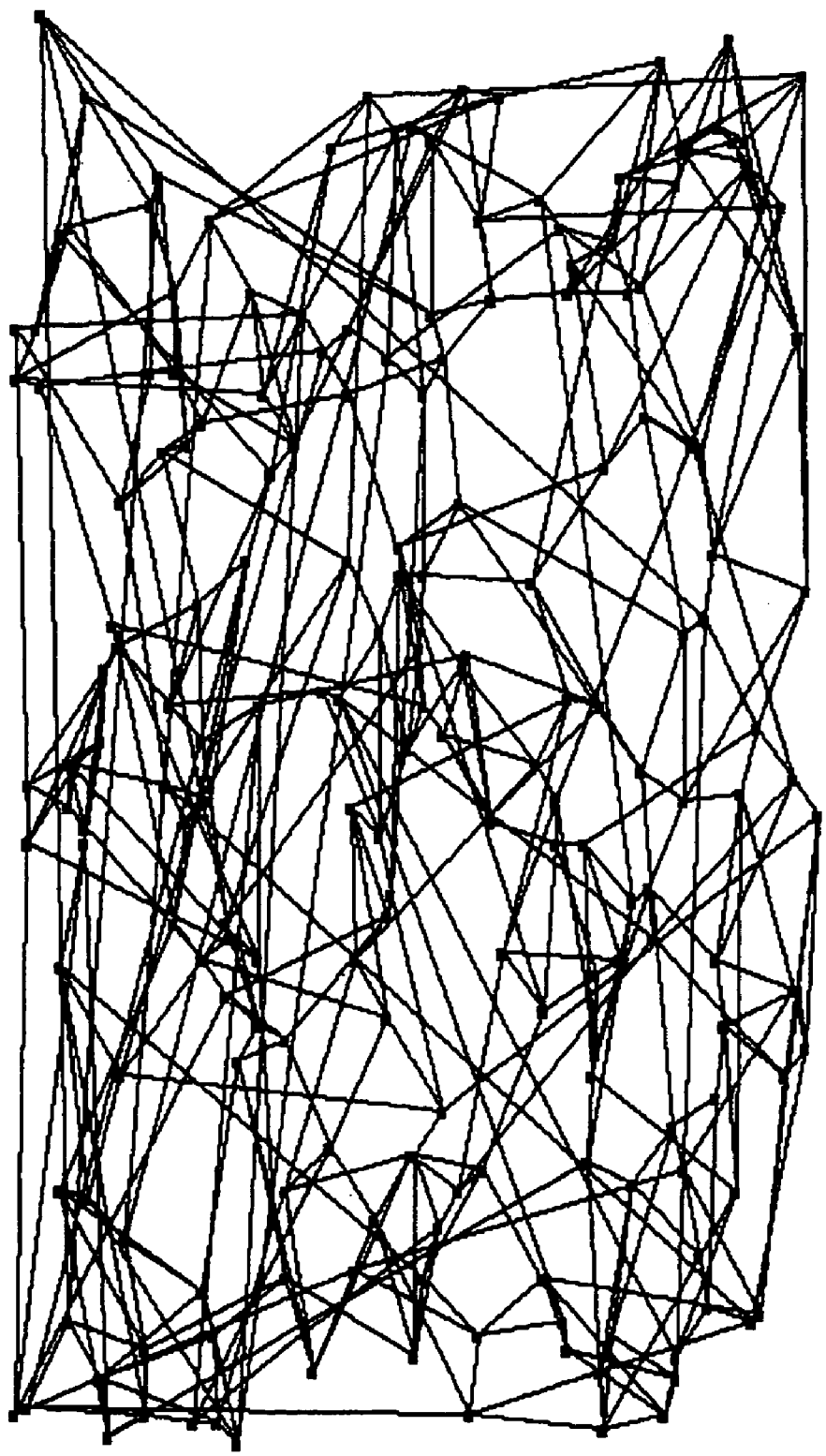
FIG. 23 shows a network for evaluating the multicast communication path calculation system according to the second embodiment.
Figure 24:
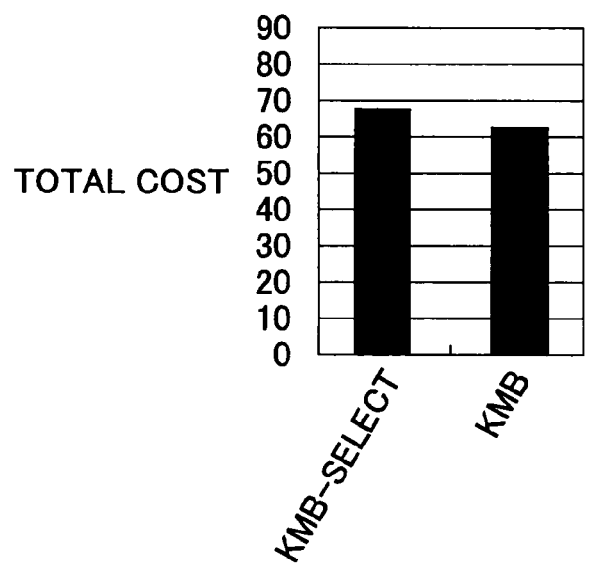
FIG. 24 shows a performance evaluation graph of multicast communication path cost.
Figure 25:
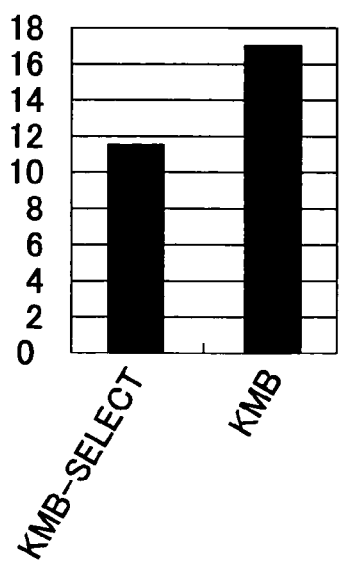
FIG. 25 shows a performance evaluation graph of transfer delay variation.

FIG. 23 shows a network for evaluating the multicast communication path calculation system. As shown in the figure, by setting a random graph including 400 nodes and bandwidth for each link, a multicast tree including 40 destination nodes are constructed. FIG. 24 shows a performance evaluation graph of multicast paths, and FIG. 25 shows a performance evaluation graph of delay variation. As shown in the evaluation result, although transfer cost increases slightly according to the method of the present invention compared with the KMB communication method, delay variation of the whole tree can be suppressed according to the method of the present invention.

As mentioned above, by using the calculation method of the present invention, an optimal multicast communication paths can be established according to QoS requirement of each multicast traffic, and bandwidth can be used efficiently in the whole network, so that a high performance multicast communication network can be established.

In the same way as the first embodiment, the operation shown in FIG. 11 can be realized by installing a program of the present invention in a computer that functions as the multicast communication path calculation apparatus. In addition, the program can be sent and received via a network.

The program can be stored in a hard disk of a computer, or in a movable recording medium such as a flexible disk and CD-ROM and the like. The stored program can be installed to the computer.

In addition, the multicast paths can be established on the network in the same way as the first embodiment.

As mentioned above, according to the calculation method of this embodiment, multicast paths can be established in which delay variation can be suppressed while suppressing cost of the whole network. Thus, an efficient and high-performance multicast communication network can be constructed.

The present invention is not limited to the specifically disclosed embodiments, and variations and modifications may be made without departing from the scope of the present invention.

What is claimed is:

1. A multicast communication path calculation method for obtaining multicast paths from a given source node to a plurality of destination nodes in a network including a plurality of nodes, the method comprising:

obtaining minimum delay paths from the source node to each of the plurality of destination nodes using topology information and delay information of the network;

selecting candidate nodes of a rendezvous point node only from nodes on one of the obtained minimum delay paths;

for each of the candidate nodes, calculating minimum delay paths from the candidate node to each of the destination nodes, and obtaining a difference between a maximum value and a minimum value among delays of the calculated minimum delay paths;

selecting, as the rendezvous point node, the candidate node for which the difference is smallest among differences for all of the candidate nodes; and outputting, as the multicast paths, a minimum delay path from the source node to the rendezvous point node and minimum delay paths from the rendezvous point node to each destination node.

2. The multicast communication path calculation method as claimed in claim 1, wherein the minimum delay path on which the candidate nodes exist is one having maximum delay among minimum delay paths from the source node to each of the destination nodes.

3. A multicast communication path setting method, wherein a multicast communication path calculation apparatus calculates multicast paths from a given source node to a plurality of destination nodes in a network including a plurality of nodes, and a multicast communication path setting apparatus establishes the calculated multicast paths on the network, wherein the multicast communication path setting apparatus sends a request to calculate the multicast paths to the multicast communication path calculation apparatus, and the multicast communication path calculation apparatus calculates the multicast paths according to the request by using a method comprising:

obtaining minimum delay paths from the source node to each of the plurality of destination nodes using topology information and delay information of the network;

selecting candidate nodes of a rendezvous point node only from nodes on one of the obtained minimum delay paths;

for each of the candidate nodes, calculating minimum delay paths from the candidate node to each of the destination nodes, and obtaining a difference between a maximum value and a minimum value among delays of the calculated minimum delay paths;

selecting, as the rendezvous point node, the candidate node for which the difference is smallest among the differences for all of the candidate nodes; and outputting results comprising, as the multicast paths, a minimum delay path from the source node to the rendezvous point node and minimum delay paths from the rendezvous point node to each destination node, wherein the multicast communication path calculation apparatus sends the output results to the multicast communication path setting apparatus, and the multicast communication path setting apparatus establishes the multicast paths according to the output results.

4. The multicast communication path setting method as claimed in claim 3, wherein each node in the network measures traffic state of the network and sends the measurement results to the multicast communication path calculation apparatus, and the multicast communication path calculation apparatus calculates the multicast paths according to the measurement results.

5. A multicast communication path calculation apparatus for obtaining multicast paths from a given source node to a plurality of destination nodes in a network including a plurality of nodes, the apparatus comprising:

a part configured to obtain minimum delay paths from the source node to each of the plurality of destination nodes using topology information and delay information of the network;

a part configured to select candidate nodes of a rendezvous point node only from nodes on one of the obtained minimum delay paths;

a part configured to calculate, for each of the candidate nodes, minimum delay paths from the candidate node to each of the destination nodes, and obtain, for each of the candidate nodes, a difference between a maximum value and a minimum value among delays of the calculated minimum delay paths;

a part configured to select, as the rendezvous point node, the candidate node for which the difference is smallest among the differences for all of the candidate nodes; and a part configured to output results comprising, as the multicast paths, a minimum delay path from the source node to the rendezvous point node and minimum delay paths from the rendezvous point node to each of the destination nodes.

6. The multicast communication path calculation apparatus as claimed in claim 5, wherein the minimum delay path on which the candidate nodes exist is one having maximum delay among minimum delay paths from the source node to each of the destination nodes.

7. The multicast communication path calculation apparatus as claimed in claim 5, further comprising:

a part configured to receive the topology information and the delay information of the network; and a part configured to store the received information in a recording medium, wherein the multicast communication path calculation apparatus calculates the multicast paths by reading the received information from the recording medium.

8. The multicast communication path calculation apparatus as claimed in claim 5, further comprising:

a part configured to include the output results in a multicast path setting control message, and send the multicast path setting control message over the multicast paths indicated by the output results.

9. The multicast communication path calculation apparatus as claimed in claim 5, further comprising:

a part configured to receive a request to calculate the multicast paths from a multicast communication path setting apparatus; and a part configured to send the output results to the multicast communication path setting apparatus.

10. A computer readable medium storing program code, which when executed by a computer, causes the computer perform a method of calculating multicast paths from a given source node to a plurality of destination nodes in a network including a plurality of nodes, the method comprising:

obtaining minimum delay paths from the source node to each of the plurality of destination nodes using topology information and delay information of the network;

selecting candidate nodes of a rendezvous point node only from nodes on one of the obtained minimum delay paths;

calculating, for each of the candidate nodes, minimum delay paths from the candidate node to each of the destination nodes, and obtaining, for each of the candidate nodes, a difference between a maximum value and a minimum value among delays of the calculated minimum delay paths;

selecting, as the rendezvous point node, the candidate node for which the difference is smallest among the differences for all of the candidate nodes; and outputting results comprising, as the multicast paths, a minimum delay path from the source node to the rendezvous point node and minimum delay paths from the rendezvous point node to each of the destination nodes.

11. The computer readable medium as claimed in claim 10, wherein the minimum delay path on which the candidate nodes exist is one having maximum delay among minimum delay paths from the source node to each of the destination nodes.

* * * * *